US010574417B2

(12) United States Patent
Somasundaram et al.

(10) Patent No.: US 10,574,417 B2
(45) Date of Patent: Feb. 25, 2020

(54) METHOD AND APPARATUS FOR MTC DEVICE ASSOCIATION SCHEMES

(71) Applicant: QUALCOMM Incorporated, San Diego, CA (US)

(72) Inventors: Kiran Somasundaram, San Diego, CA (US); Hao Xu, San Diego, CA (US); Wanshi Chen, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 301 days.

(21) Appl. No.: 14/195,620

(22) Filed: Mar. 3, 2014

(65) Prior Publication Data
US 2014/0247781 A1    Sep. 4, 2014

Related U.S. Application Data

(60) Provisional application No. 61/806,653, filed on Mar. 29, 2013, provisional application No. 61/772,399, filed on Mar. 4, 2013.

(51) Int. Cl.
*H04W 4/70* (2018.01)
*H04W 48/12* (2009.01)
*H04L 5/00* (2006.01)

(52) U.S. Cl.
CPC ............. *H04L 5/0053* (2013.01); *H04W 4/70* (2018.02); *H04W 48/12* (2013.01)

(58) Field of Classification Search
CPC ...... H04L 5/0053; H04W 4/005; H04W 24/10
See application file for complete search history.

(56) References Cited

U.S. PATENT DOCUMENTS

| 2010/0103902 A1* | 4/2010 | Kim et al. ............... 370/330 |
| 2011/0158164 A1* | 6/2011 | Palanki et al. ............ 370/328 |

(Continued)

FOREIGN PATENT DOCUMENTS

| CN | 102378211 A | 3/2012 |
| JP | 2014509489 A | 4/2014 |

(Continued)

OTHER PUBLICATIONS

ISA/EPO, International Search Report and Written Opinion of the Internationail Searching Authority, Int'l App. No. PCT/US2014/020114, May 30, 2014, European Patent Office, Rijswijk, NL, 10 pgs.

*Primary Examiner* — Andrew Lai
*Assistant Examiner* — M Mostazir Rahman
(74) *Attorney, Agent, or Firm* — Holland & Hart LLP

(57) ABSTRACT

Methods and apparatuses are described for wireless communications in which various association schemes may be performed for a machine type communication (MTC) device. In a long-term evolution (LTE) heterogeneous network, the MTC device may associate with a macro cell or a small cell using a narrowband MTC channel supported by the cells. Information about the MTC channel, including its frequency spectrum, may be transmitted to the MTC device using reserved bits in a physical broadcast channel (PBCH). Once the MTC device identifies the MTC channel, it may communicate with one or more cells during a frame or during a sub-frame. The MTC device may determine channel metrics of the cells from the MTC communication and may identify a cell with which to associate from the channel metrics. The association may be to a best downlink cell or a best uplink cell based on the operating profile of the MTC device.

28 Claims, 29 Drawing Sheets

(56) References Cited

U.S. PATENT DOCUMENTS

| | | | |
|---|---|---|---|
| 2011/0211500 A1* | 9/2011 | Sawahashi | H04W 72/00 370/280 |
| 2011/0270984 A1 | 11/2011 | Park | |
| 2012/0142268 A1 | 6/2012 | Tao et al. | |
| 2012/0178464 A1 | 7/2012 | Li et al. | |
| 2012/0327895 A1 | 12/2012 | Wallen et al. | |

FOREIGN PATENT DOCUMENTS

| | | |
|---|---|---|
| WO | WO-2011129674 A2 | 10/2011 |
| WO | WO-2012106847 A1 | 8/2012 |
| WO | WO-2013006019 A2 | 1/2013 |

\* cited by examiner

METHOD AND APPARATUS FOR MTC DEVICE ASSOCIATION SCHEMES

CROSS REFERENCES

The present application for patent claims priority to U.S. Provisional Patent Application No. 61/772,399 by Somasundaram et al., entitled "Method and Apparatus for MTC Device Association Schemes," filed Mar. 4, 2013, and U.S. Provisional Patent Application No. 61/806,653 by Somasundaram et al., entitled "Method and Apparatus for MTC Device Profiles Negotiation," filed Mar. 29, 2013, assigned to the assignee hereof, and expressly incorporated by reference herein.

BACKGROUND

Wireless communication networks are widely deployed to provide various communication services such as voice, video, packet data, messaging, broadcast, and the like. These wireless networks may be multiple-access networks capable of supporting multiple users by sharing the available network resources.

A wireless communication network may include a number of base stations or NodeBs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

The UE may be a machine type communication (MTC) device and the wireless communication network may be a heterogeneous network with macro cells and also small cells (e.g., low power nodes or LPNs). In some instances, the coverage of the small cells may be overwhelmed by that of the macro cells and the MTC device may find it difficult to associate with a small cell. Thus, it may be desirable to use systems, methods, and devices that address the effects of strong macro cells in a heterogeneous network to enable an MTC device to associate with a small cell.

SUMMARY

Methods and apparatuses are described for wireless communications in which various association schemes may be performed for an MTC device. In a heterogeneous network, the MTC device or MTC UE may associate with a macro cell or a small cell using a narrowband MTC channel supported by the cells. Information about the MTC channel, including the channel's frequency spectrum and/or other properties, may be transmitted to the MTC device by a base station associated with the macro cell or with the small cell using reserved bits in a physical broadcast channel (PBCH). Once the MTC device identifies or locates the MTC channel, the MTC device may communicate with a cell during specified physical resource blocks (PRBs) of a frame or sub-frame that correspond to the MTC channel. The PRBs for one cell or base station may be different from the PRBs for another cell or base station so that the MTC communication of one cell does not affect the MTC communication of another. The MTC device may determine channel metrics of the cells from the MTC communication and may identify a cell with which to associate from the channel metrics. The association may be to a best downlink cell or to a best uplink cell based on the operating profile of the MTC device. This approach may allow the MTC device to discover and associate with a small cell or low power node (LPN) even in the presence of a strong macro cell.

A method for wireless communications includes identifying, at a user equipment, one or more properties of a channel supported by a base station for machine type communication (MTC), where the one or more properties are identified based at least in part on one or more bits in a signal received from the base station through a broadcast channel. The method also includes communicating MTC information with the base station in accordance with the one or more channel properties. In some embodiments, the channel for MTC may have a corresponding set of resource blocks, and the one or more properties may identify a frequency offset of the set of resource blocks. In some embodiments, the channel for MTC may have a corresponding set of resource blocks, and the one or more properties may identify a position of the set of resource blocks in different sub-frames.

In some embodiments, the channel for MTC may have a corresponding set of resource blocks, the base station may support one or more additional channels for MTC, where each of the one or more additional channel for MTC may have a corresponding set of resource blocks different from those of any other channel supported by the base station, and the one or more properties may identify a position of each set of resource blocks in a same sub-frame. In some embodiments, the method may also include selecting between a first set of resource blocks and a second set of resource blocks from the one or more additional sets of resource blocks for communicating MTC information with the base station. The selecting may include identifying a particular bit in a unique identifier of the user equipment, and selecting between the first set of resource blocks and the second set of resource blocks based on a value of the bit. In some embodiments, the one or more properties may identify one or more time periods during which the base station supports the channel for MTC, and the method may include waking up the user equipment for communicating MTC information with the base station in accordance with the one or more time periods.

In some examples, the user equipment may receive MTC information from a first base station during one or more sub-frames in a frame and from a second base station during one or more different sub-frames in the same frame. The method may also include determining a first channel metric for the first base station based at least in part on the MTC information received from the first base station and determining a second channel metric for the second base station based at least in part on the MTC information received from the second base station. One of the first base station and the second base station may be selected for association with the user equipment, where the selection is based at least in part on the first channel metric and the second channel metric.

An apparatus for wireless communications includes means for identifying, at a user equipment, one or more properties of a channel supported by a base station for MTC, where the one or more properties are identified based at least in part on one or more bits in a signal received from the base station through a broadcast channel. The apparatus also includes means for communicating MTC information with the base station in accordance with the one or more channel properties. In some embodiments, the channel for MTC may have a corresponding set of resource blocks, and the one or more properties may identify a frequency offset of the set of resource blocks. In some embodiments, the channel for MTC may have a corresponding set of resource blocks, and the one or more properties may identify a position of the set of resource blocks in different sub-frames.

In some embodiments, the channel for MTC may have a corresponding set of resource blocks, the base station may support one or more additional channels for MTC, where each of the one or more additional channels for MTC may have a corresponding set of resource blocks different from those of any other channel supported by the base station, and the one or more properties may identify a position of each set of resource blocks in a same sub-frame. In some embodiments, the apparatus also includes means for selecting between a first set of resource blocks and a second set of resource blocks from the one or more additional sets of resource blocks for communicating MTC information with the base station. In some embodiments, the means for selecting may include means for identifying a particular bit in a unique identifier of the user equipment, and means for selecting between the first set of resource blocks and the second set of resource blocks based on a value of the bit. In some embodiments, the one or more properties may identify one or more time periods during which the base station supports the channel for MTC, and the apparatus may include means for waking up the user equipment for communicating MTC information with the base station in accordance with the one or more time periods.

An apparatus for wireless communications includes an MTC module configured to identify, at a user equipment, one or more properties of a channel supported by a base station for MTC, where the one or more properties are identified based at least in part on one or more bits in a signal received from the base station through a broadcast channel. The apparatus also includes a transceiver module configured to communicate MTC information with the base station in accordance with the one or more channel properties. In some embodiments, the channel for MTC may have a corresponding set of resource blocks, and the one or more properties may identify a frequency offset of the set of resource blocks. In some embodiments, the channel for MTC may have a corresponding set of resource blocks, and the one or more properties may identify a position of the set of resource blocks in different sub-frames.

In some embodiments, the channel for MTC may have a corresponding set of resource blocks, the base station may support one or more additional channels for MTC, where each of the one or more additional channels for MTC may have a corresponding set of resource blocks different from those of any other channel supported by the base station, and the one or more properties may identify a position of each set of resource blocks in a same sub-frame. In some embodiments, the MTC module may be further configured to select between a first set of resource blocks and a second set of resource blocks from the one or more additional sets of resource blocks for communicating MTC information with the base station. In some embodiments, the MTC module may be further configured to identify a particular bit in a unique identifier of the user equipment, and to select between the first set of resource blocks and the second set of resource blocks based on a value of the bit. In some embodiments, the one or more properties may identify one or more time periods during which the base station supports the channel for MTC, and the apparatus may further include a processor module configured to wake up the user equipment for communicating MTC information with the base station in accordance with the one or more time periods.

A computer program product includes a non-transitory computer-readable medium having code for causing at least one computer to identify, at a user equipment, one or more properties of a channel supported by a base station for MTC, where the one or more properties are identified based at least in part on one or more bits in a signal received from the base station through a broadcast channel. The non-transitory computer-readable medium also has code for causing the at least one computer to communicate MTC information with the base station in accordance with the one or more channel properties. In some embodiments, the channel for MTC may have a corresponding set of resource blocks, and the one or more properties may identify a frequency offset of the set of resource blocks. In some embodiments, the channel for MTC may have a corresponding set of resource blocks, and the one or more properties may identify a position of the set of resource blocks in different sub-frames.

In some embodiments, the channel for MTC may have a corresponding set of resource blocks, the base station may support one or more additional channels for MTC, where each of the one or more additional channels for MTC may have a corresponding set of resource blocks different from those of any other channel supported by the base station, and the one or more properties may identify a position of each set of resource blocks in a same sub-frame. In some embodiments, the non-transitory computer-readable medium may have code for causing the at least one computer to select between a first set of resource blocks and a second set of resource blocks from the one or more additional sets of resource blocks for communicating MTC information with the base station. In some embodiments, the non-transitory computer-readable medium may have code for causing the at least one computer to identify a particular bit in a unique identifier of the user equipment, and code for causing the at least one computer to select between the first set of resource blocks and the second set of resource blocks based on a value of the bit. In some embodiments, the one or more properties may identify one or more time periods during which the base station supports the channel for MTC, and the non-transitory computer-readable medium may have code for causing the at least one computer to wake up the user equipment for communicating MTC information with the base station in accordance with the one or more time periods.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
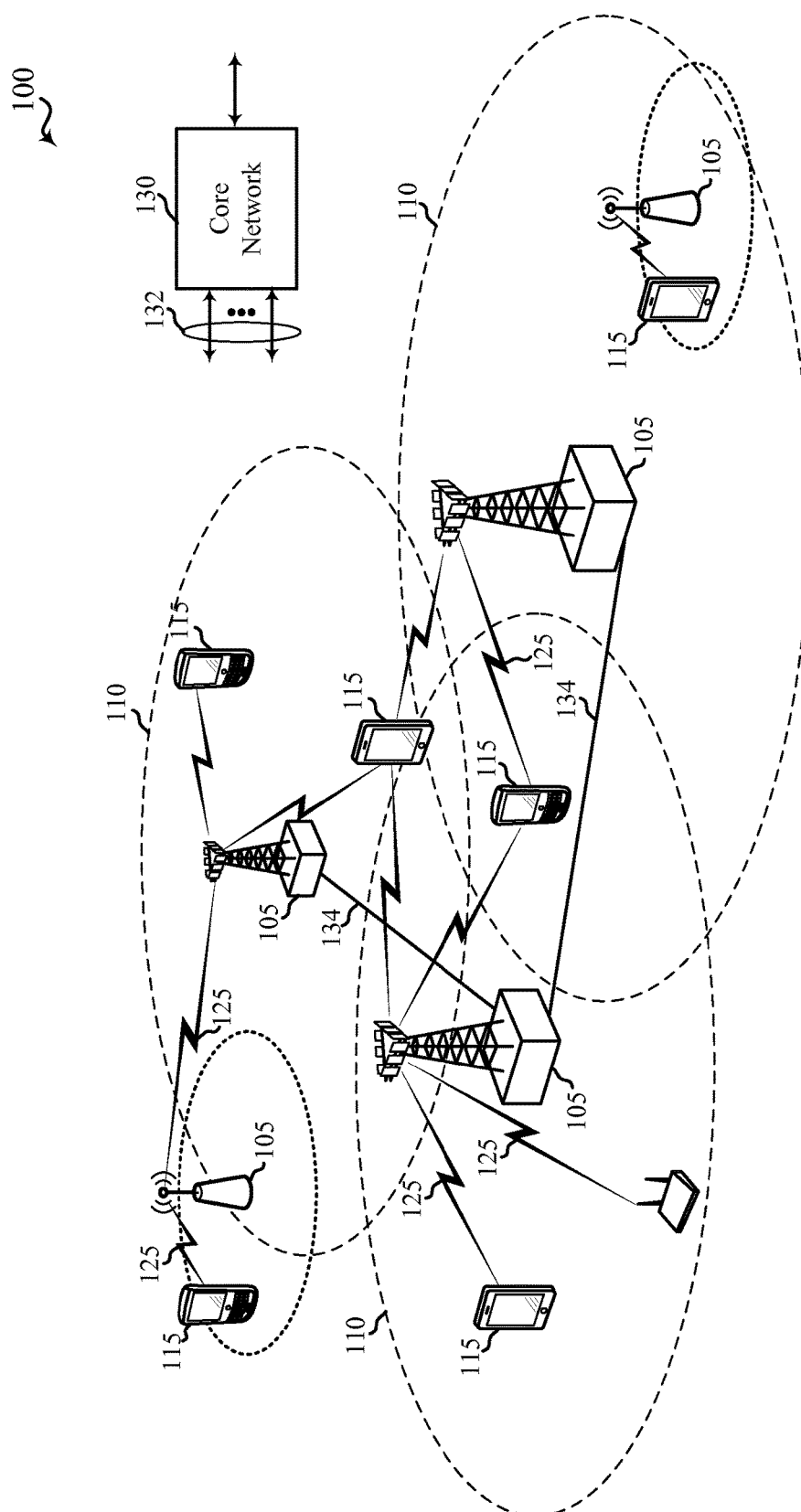
FIG. 1 shows a diagram that illustrates an example of a wireless communications system according to various embodiments.

Described embodiments are directed to methods and apparatuses for wireless communications in which various association schemes may be performed for an MTC device and the MTC device may negotiate a connection for MTC communications. In a heterogeneous network, such as an LTE heterogeneous network, for example, the MTC device or MTC UE may associate with a macro cell or with a small cell using a narrowband MTC channel supported by the cells. Information about the MTC channel, including the channel's frequency spectrum and/or other properties, may be transmitted to the MTC device by a base station associated with the macro cell or with the small cell using reserved bits in the PBCH. Once the MTC device identifies or locates the MTC channel, the MTC device may communicate with a cell during specified physical resource blocks (PRBs) of a frame or sub-frame that correspond to the MTC channel. The PRBs for one cell or base station may be different from the PRBs for another cell or base station so that MTC communication of one cell does not overwhelm or interfere with the MTC communication of another cell. The MTC device may determine channel metrics (e.g., path loss, signal strength) of the cells from the MTC communication and may identify a cell with which to associate from the channel metrics. The association may be to a best downlink cell or a best uplink cell based, at least in part, on the operating profile of the MTC device. This approach may allow the MTC device to discover and associate with a small cell or low power node (LPN) even in the presence of a strong macro cell.

After associating with one of the cells, the MTC device may receive radio resource control (RRC) messages from the associated cell (e.g., base station) that include information about the MTC profiles supported by the cell. In some cases, the RRC messages from the associated cell are in response to a request made by the MTC device. The MTC device may transmit RRC messages to the cell with information about the MTC profiles supported by the MTC device. The MTC device and the cell may negotiate and determine a compatible MTC profile with which to establish a connection that will enable MTC communications between them. When the results from the negotiation indicate that the MTC profiles are incompatible, the MTC device may send an RRC rejection message to the cell and may associate with another cell in the LTE heterogeneous network to establish a connection for MTC communications.

The MTC devices or MTC UEs have low complexity and are typically used for machine-to-machine (M2M) communications. M2M communications generally allow a device such as a sensor or meter (e.g., thermostat) to capture information that is then relayed through a network to another device (e.g., server) for processing. M2M traffic tends to be delay tolerant and happens in infrequent bursts of small data. An MTC device may generally operate in a narrowband and may not have interference cancellation support. The band of an MTC device may be approximately 1 Megahertz (MHz), which corresponds to about 6 PRBs in an LTE system.

Some wireless technologies, such as WiFi or Zigbee, for example, may be used for M2M communications, but these technologies operate in unlicensed bands and do not guarantee quality-of-service (QoS). On the other hand, cellular technologies guarantee QoS, which may be needed for some M2M communications. Cellular operators are rapidly deploying LTE heterogeneous networks (HetNets) in which macro cells are deployed with a layer of small cells, also referred to as low power nodes or LPNs. The small cell densification that results from the deployment of LTE HetNets makes these networks attractive for M2M communication because it reduces the transmit power requirements of the MTC device as the distance between the MTC device and the nearest cell is reduced. That is, the MTC device need not send strong transmissions (i.e., shout) because there are nearby cells available for association, thus conserving power, which may be a consideration when the MTC device is battery-operated.

LTE HetNets typically have a co-channel deployment of macro cells and small cells. That is, the small cells or LPNs are deployed in the same frequency band as the macro cells. Co-channel deployment may prove challenging for MTC devices and M2M communications because the small cell coverage may be overwhelmed by the strong coverage of the macro cell. For example, a typical base station in a macro cell transmits at approximately 40 Watts (W) while a typical base station in a small cell transmits at approximately 1 W. As a result, using traditional association schemes that are based on received power (e.g., reference signal received power or RSRP) may tend to associate most MTC devices to a strong macro cell instead of a more suitable or appropriate nearby small cell. For example, when a small cell in an LTE HetNet has a smaller path loss to an MTC device and the MTC device is out of the coverage provided by the small cell, the MTC device will have a difficult time associating with the small cell (i.e., the cell with the best uplink) instead of the macro cell because the interference management methods supported by the MTC device cannot cancel the interference produced by the strong macro cell. Various schemes are presented below that describe mechanisms by which an MTC device or MTC UE may discover a small cell or LPN and may associate with that small cell or LPN in a co-channel LTE HetNet even in the presence of a strong macro cell.

After association, an MTC UE device may still need to establish a connection with the cell with which it is associated to enable MTC communications. Typically, establishing a connection may involve mechanisms that may be complex for an MTC UE to implement or use. Thus, efficient mechanisms may be needed that enable the MTC UE and the associated cell to negotiate a connection for MTC communications. Various embodiments of such mechanisms are also presented below.

Techniques described herein may be used for various wireless communications systems such as cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100. The wireless communications system 100 includes base stations (or cells) 105, user equipments (UEs) 115, and a core network 130.

The base stations 105 may communicate with the UEs 115 under the control of a core network 130. Base stations 105 may communicate control information and/or user data with the core network 130 through backhaul links 132. In embodiments, the base stations 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base station 105 sites may provide communication coverage for a respective geographic coverage area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The geographic coverage area 110 for a base station may be divided into sectors making up only a portion of the coverage area (not shown). The wireless communications system 100 may include base stations 105 of different types (e.g., macro, micro, and/or pico base stations). There may be overlapping coverage areas for different technologies.

In embodiments, the wireless communications system 100 is an LTE/LTE-A network. In LTE/LTE-A networks, the term evolved Node B (eNB) may be generally used to describe the base stations 105 respectively. The wireless communications system 100 may be a Heterogeneous LTE/LTE-A network in which different types of eNBs provide coverage for various geographical regions. For example, each eNB may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul link 132 (e.g., S1, etc.). The base stations 105 may also communicate with one another, e.g., directly or indirectly via backhaul links 134 (e.g., X2, etc.) and/or via backhaul links 132 (e.g., through core network 130). The wireless communications system 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 are dispersed throughout the wireless communications system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communication links 125 shown in the wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions.

In some embodiments of the wireless communications system 100, one or more of the UEs 115 are MTC devices or MTC UEs, and various association schemes may be performed for them. When the wireless communications system 100 is a heterogeneous LTE/LTE-A network (LTE HetNet), an MTC UE 115 may associate with a macro cell or a small cell using a narrowband MTC channel supported by the cells. Information about the MTC channel, including the channel's frequency spectrum and/or other properties, may be transmitted to the MTC UE 115 by a base station 105 associated with the macro cell or with the small cell using reserved bits in the PBCH. Once the MTC device identifies or locates the MTC channel, the MTC device may communicate with a cell during specified PRBs of a frame or sub-frame that correspond to the MTC channel. The PRBs for one cell or base station 105 may be different from the PRBs for another cell or base station 105 so that the MTC communication of one cell does not overwhelm or interfere with the MTC communication of another cell. The MTC UE 115 may determine channel metrics of the cells from the MTC communication and may identify a cell with which to associate from the channel metrics. The association may be to a best downlink cell or a best uplink cell based on the operating profile of the MTC device. This approach may allow the MTC device to discover and associate with a small cell or LPN even in the presence of a strong macro cell.

Figure 2A:
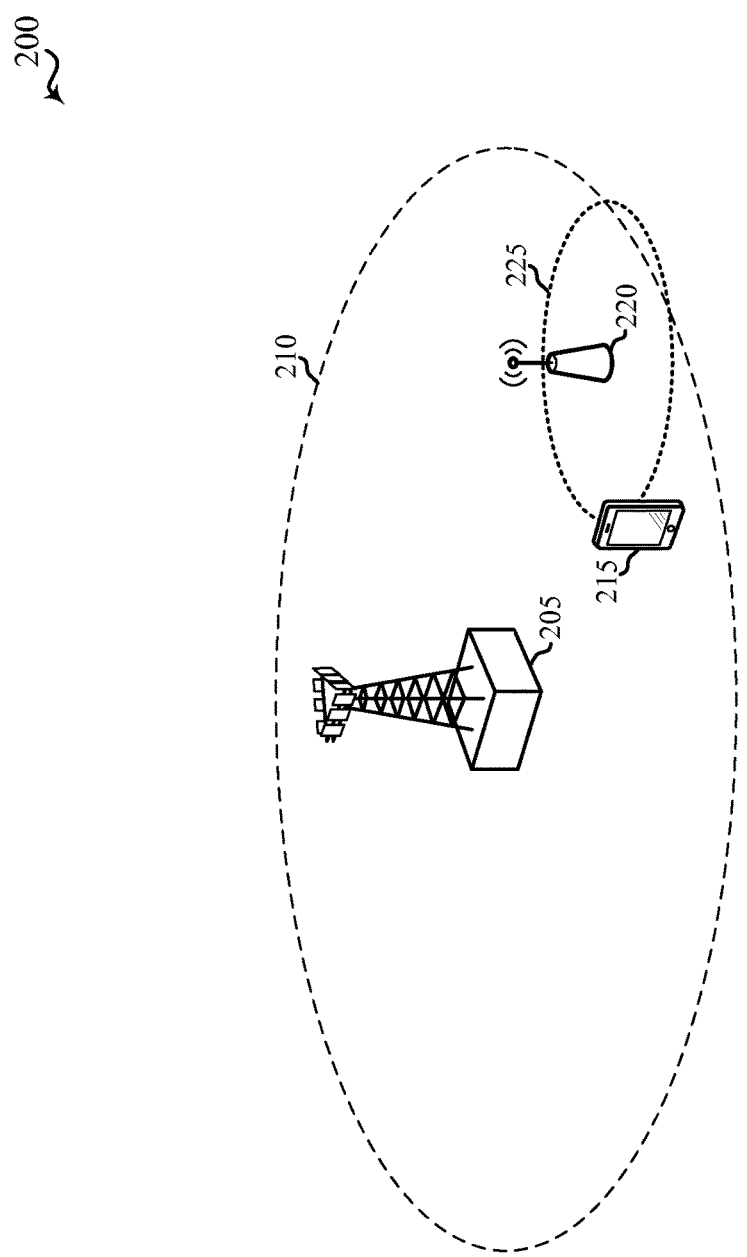
FIG. 2A shows a diagram that illustrates an example of a heterogeneous wireless communication system according to various examples.

Turning next to FIG. 2A, a diagram 200 is shown that illustrates a portion of the wireless communications 100 of FIG. 1 that includes a macro cell base station 205 with corresponding geographic coverage area 210, and a small cell or LPN base station 220 with corresponding coverage area 225. Also shown in FIG. 2A is an MTC device or MTC UE 215. In a co-channel heterogeneous LTE network, the macro cell base station 205 and the LPN base station 220 use the same frequency band, which may make it difficult for the MTC UE 215 to associate with the LPN base station 220. Various association schemes may be used to enable such association, including one scheme in which the association is based legacy channels where the downlink (DL) is decoupled from the uplink (UL), another scheme based on new narrowband channels in which the base stations or eNBs are time-division multiplexed across power classes, another scheme also based on new narrowband channels in which the macro cell is operated at a lower power level for MTC communication, and yet another scheme also based on new narrowband channels in which the macro cell is muted or silenced to enable the LPN to perform MTC communication without interference.

Figure 2B:
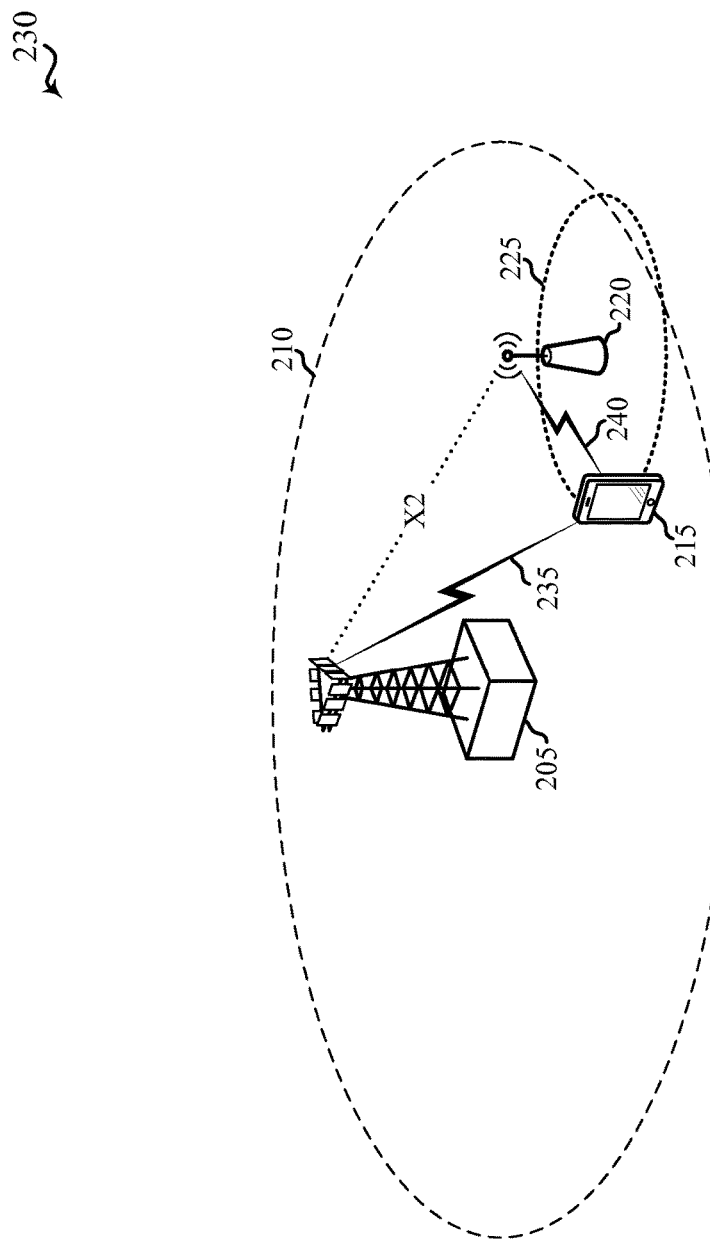
FIG. 2B shows a diagram that illustrates an example of an association scheme for an MTC device based on legacy channels according to various examples.

Turning to FIG. 2B, a diagram 230 is shown that illustrates an association scheme based on legacy channels with the macro cell or base station 205, the small cell or LPN base station 220, and the MTC UE 215 of FIG. 2B. On legacy channels/reference symbols (RS) such as primary synchronization signal (PSS), secondary synchronization signal (SSS), PBCH, and cell-specific reference signal (CRS), for example, the MTC UE 215 may receive very strong DL signals 235 from the macro cell base station 205, overwhelming the reception from the LPN base station 220. The LPN base station 220, on the other hand, may detect the MTC UE 215 through various UL signatures that are sent by the MTC UE 215 in a physical random access channel (PRACH) through signals 240.

In the scenario illustrated in FIG. 2B, the MTC UE 215 may have an association in which the DL is decoupled from the UL. That is, the DL is handled by one cell and the UL is handled by another cell. For example, the MTC UE 215 may associate with the strong macro cell base station 205 and may receive control and data from the macro cell base station 205 on the DL (e.g., signals 235). On the UL, the MTC UE 215 may communicate data and control with the LPN base station 220 and the LPN base station 220 may relay the UL information to the macro cell base station 205 over backhaul links (e.g., X2 interface).

To effectively implement the association scheme based on legacy channels and the other schemes described herein, the MTC communication between the MTC UE 215 and the various cells in an heterogeneous network may bootstrap the narrowband channel communication that is typically supported by the front-end receiver in an MTC device. For example, all MTC communication, including data and control, may be defined in narrowband channels. For LTE HetNets, operators typically have 10 MHz of spectrum, so 1 MHz of the MHz spectrum may be used as a narrowband channel for MTC communication. A 1 MHz spectrum corresponds to about 6 PRBs in LTE.

In operation, the MTC UE 215 wakes up and reads PSS, SSS, and/or PBCH. Because of the narrowband of the receiver, the MTC UE 215 may not read traditional system information blocks (SIBs). After the initial reading, the MTC UE 215 may perform a brute force raster of the location of the MTC channel in the 10 MHz spectrum. Such an approach may consume a lot of power and may take considerable time. Another approach, which may reduce the raster time is to acquire the legacy LTE PSS and SSS and then move to the MTC narrowband channel based on information signaled through reserve bits in the PBCH. For example, two or more of reserved bits in the PBCH may be used to indicate where is the MTC narrowband channel in the 10 MHz spectrum.

There may be different ways in which the reserved bits in PBCH are used to indicate the different occurrences or occasions of MTC communication. In one approach, the bits may be used to signal or indicate an offset or frequency shift from the center 6 PRBs of the PBCH. This frequency shift may represent a number of PRBs that the MTC UE 215 needs to move from the center 6 PRBs for to move onto the MTC narrowband channel.

In a different approach, the reserved bits may be used to signal or indicate a generally coarse time-frequency pattern (i.e., hopping) of the different occurrences or occasions of MTC communication. One time-frequency pattern may be based on a system frame number (SFN) of a radio frame and a sub-frame number (Sub-frame_Number). For example, the time-frequency pattern may be obtained from SFN (modN)= 0+Sub-frame_Number (mod N)=0, where N and M are integer values. Another time-frequency pattern may be based on a PRB number (PRB_Number). For example, the time-frequency pattern may be obtained from PRB_Number (modL)=0, where L is an integer value. In some embodiments, the time-frequency pattern may be based on SFN, Sub-frame_Number, and PRB_Number.

In this approach, all the information regarding the MTC occasions need not be signaled or indicated by the reserved bits. The reserved bits may simply provide sufficient information for the MTC UE 215 to move onto any of the MTC occasions. In those instances when the reserved bits do not signal or indicate an MTC occasion, there is uncertainty as to where to move onto in the spectrum to be on the MTC communication channel and the MTC UE 215 may have to search over uncertain portions of the spectrum. Such a search may consume time and power, and a tradeoff may be needed to make a reasonable search effort of the uncertain portions of the spectrum.

In yet another approach for using the reserved bits in the PBCH, multiple MTC occasions on a same sub-frame and on different narrowband channels (e.g., different sets of PRBs in the same sub-frame) may be signaled or indicated with fewer bits. For example, sufficient bits may be used to indicate how many MTC occasions take place on the same sub-frame. Once the various MTC occasions are known, different MTC UEs 215 may camp on different narrowband channels through natural load-balancing. For example, when two MTC occasions occur in the same sub-frame, each MTC UE 215 may look at the same bit in a unique identifier (e.g., international mobile subscriber identity or IMSI) stored in the device and may select one channel or the other based on a value of the bit. Because the likelihood of the bit having a value of "0" or "1" is the same, approximately half of the MTC UEs 215 may select the one channel and approximately half of the MTC UEs 215 may select the other channel.

Figure 3A:
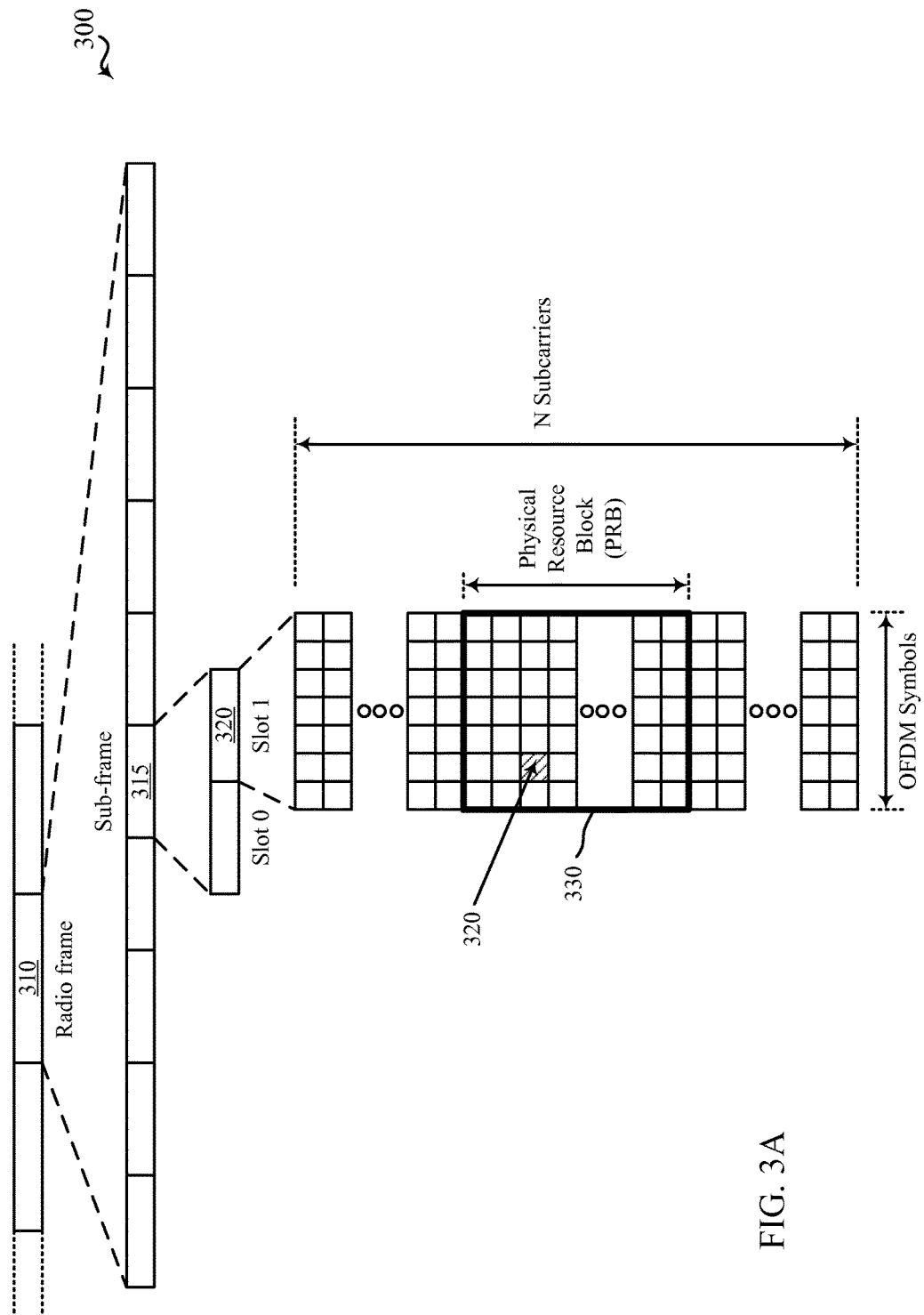
FIG. 3A shows a block diagram that illustrates an example of a structure of a long term evolution (LTE) radio frame according to various embodiments.

Turning next to FIG. 3A, a diagram 300 is shown that illustrates a radio frame 310 with multiple sub-frames 315. The radio frame 310 is typically 10 milliseconds (ms) in duration and each sub-frame 315 is typically 1 ms in duration. The radio frame 310 and the sub-frames 315 may correspond to the radio frame and sub-frames described above in connection with signaling or indicating a time-frequency pattern using the reserved bits in PBCH. FIG. 3A also shows that each sub-frame 315 includes two slots 320 and that each slot includes N subcarriers, with each subcarrier having a corresponding number of OFDM symbols. A physical resource block or PRB 330 includes the OFDM symbols of a subset of the N subcarriers. In a typical LTE system, the PRB 330 includes 12 subcarriers, with 7 OFDM symbols each, for a total of 84 resource elements 320. The PRB 330 may correspond to the PRBs described above in connection with signaling or indicating a time-frequency pattern using the reserved bits in the PBCH.

Figure 3B:
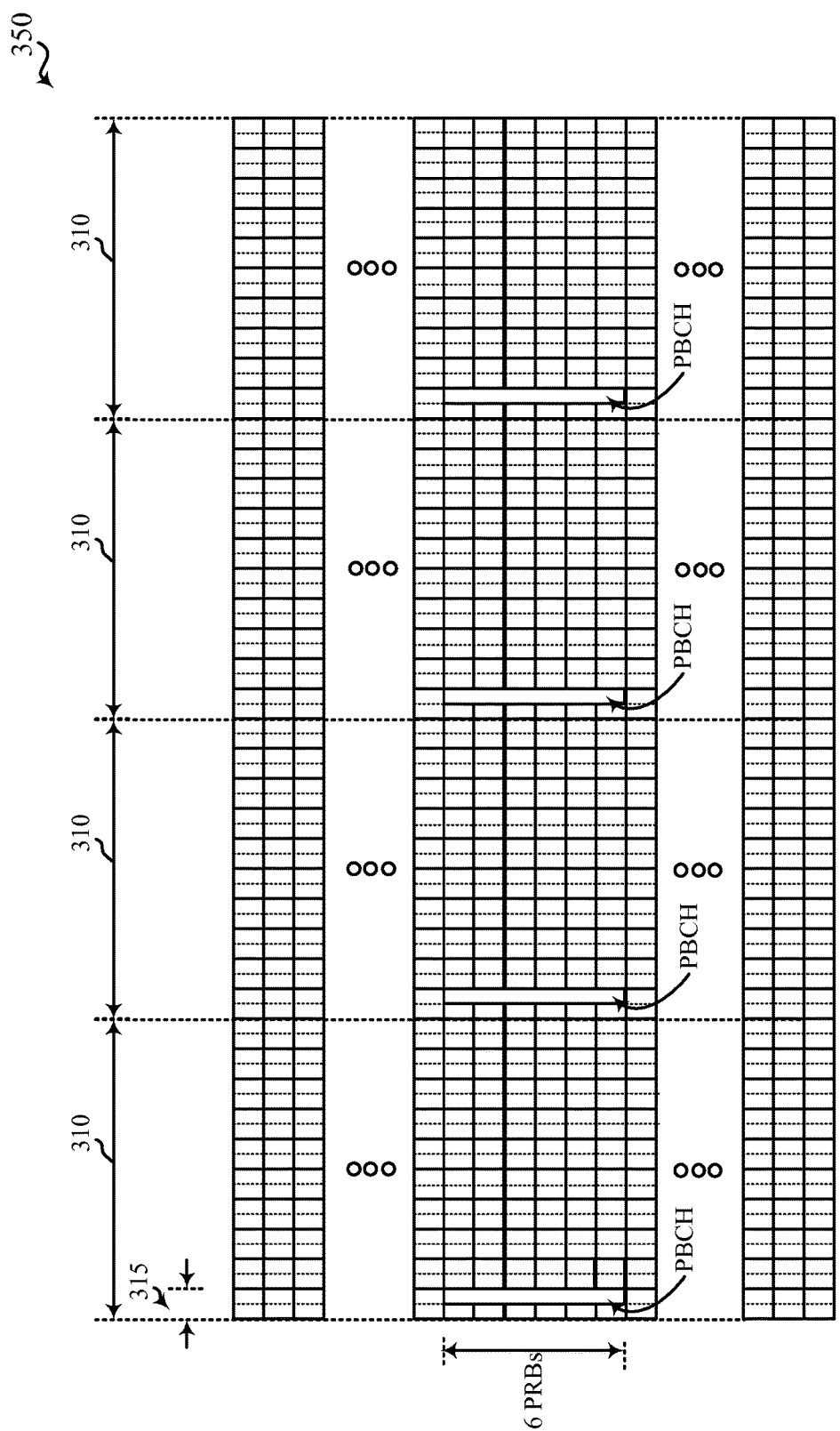
FIG. 3B shows a block diagram that illustrates an example of a physical broadcast channel (PBCH) in an LTE radio frame sequence according to various embodiments.

Turning next to FIG. 3B, a diagram 350 is shown that illustrates PBCH broadcasts, which typically span over four consecutive radio frames 310, each having 10 sub-frames 315. The PBCH broadcasts take place in sub-frame 0 of each of the radio frames 310 and are designed to be detected without any prior knowledge of the system's bandwidth. The PBCH broadcasts include information from a cell such as downlink bandwidth and SFN, for example. The information may be included in a master information block (MIB), which may also include the reserved bits described above for signaling or indicating one or more properties (e.g., frequency shift, time-frequency pattern, concurrent MTC occasions) of the MTC communication supported by the cell. The PBCH broadcasts occur over the center 6 PRBs of sub-frame 0. As described above, the MTC narrowband channel(s) may be frequency-shifted from these center 6 PRBs, may occur at different PRBs for different sub-frames, and more than one may occur (e.g., multiple MTC occasions) in the same sub-frame but in different sets of PRBs in that sub-frame.

The information provided by the PBCH through the reserved bits may include MTC service denial or deferral. For example, the PBCH information may signal or indicate that there is lack of support for MTC communication by the cell at certain time period(s). Accordingly, the MTC device or MTC UE may be in a sleep mode and wake up at pre-configured or configured times to check whether MTC communication is supported. Based on the information provided by the PBCH, the sleep mode and wake up schedule of the MTC device may be dynamically adjusted to increase the battery life of the device.

During the PRBs that are allocated by a cell for MTC communication, which may be referred to as MTC PRBs, nominal LTE scheduled data is not to occur. Cell-specific reference signals (CRSs), however, may still be present for the legacy carrier type. Moreover, for MTC narrowband communication, data, control, and reference symbols (RSs) may be self-contained in the MTC PRBs.

Figure 4:
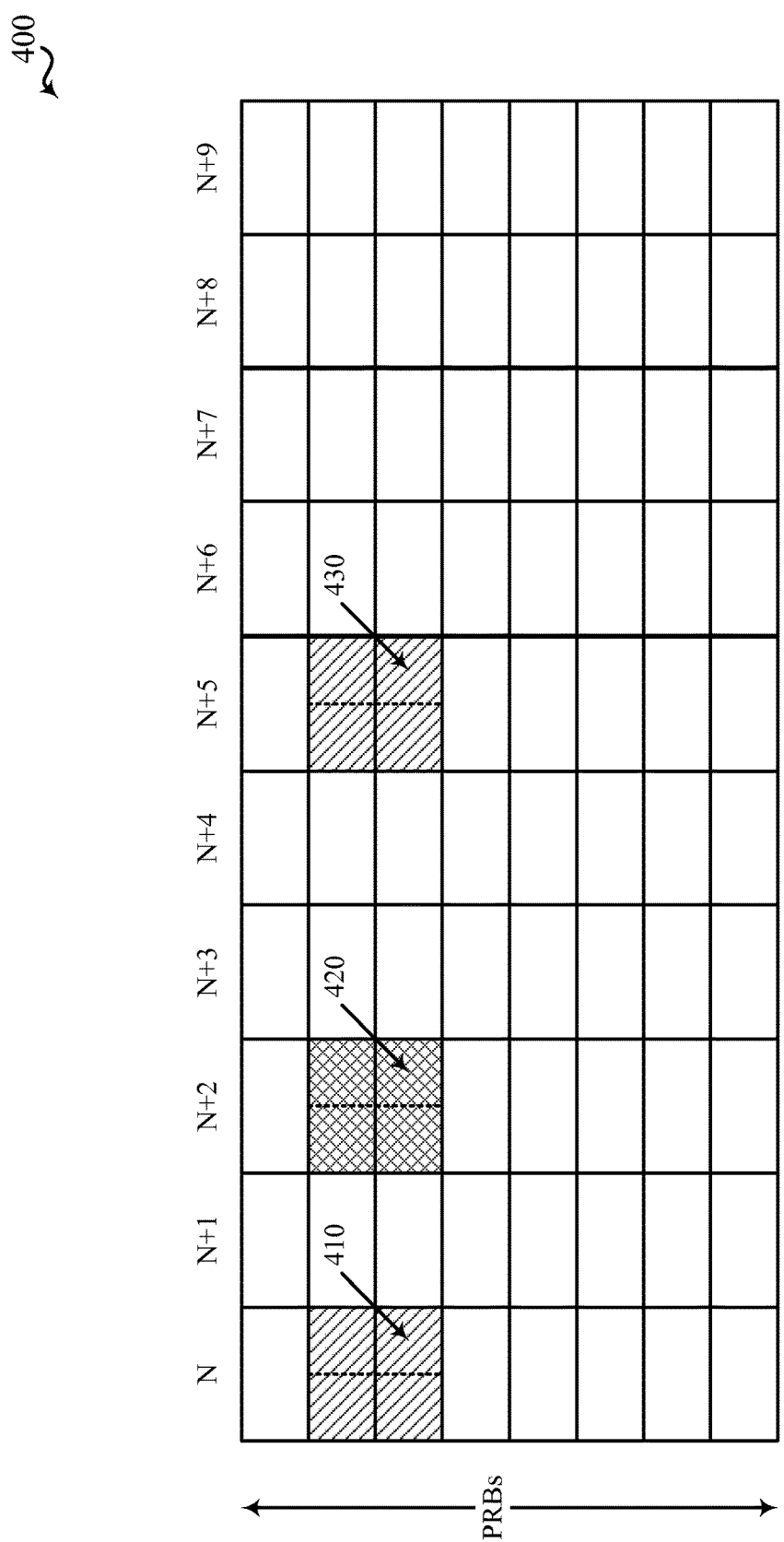
FIG. 4 shows a block diagram that illustrates an example of an association scheme for an MTC device based on new narrowband channels according to various embodiments.

Turning now to FIG. 4, a diagram 400 is shown that illustrates another association scheme in which time-division multiplexing is coordinated between different power class nodes and new narrowband channels are used for MTC communication. For example, diagram 400 shows that in sub-frames N and N+5, a high power node (e.g., macro cell) may transmit by using sets of MTC PRBs 410 and 430 (diagonal lines), respectively. In sub-frame N+2, a low power node (e.g., small cell) may transmit by using a set of MTC PRBs 420 (cross-hatched). This association scheme effectively implements a form of enhanced inter-cell interference coordination (eICIC) at the PRB level allowing a strong cell and a weaker cell to transmit at different times such that they may both be detected by an MTC device.

As described above, dominant CRSs from high power nodes may still be present in the MTC PRBs associated with the low power nodes. It is possible, however, to rate match around the resource elements corresponding to the CRSs because the MTC devices are not capacity hungry and may find acceptable to lose those dimensions.

Moreover, the periodicity or schedule shown for each power class node in the sub-frames of FIG. 4 is simply provided by way of example and not of limitation. Each power class node (e.g., high power nodes, low power nodes) may adjust its periodicity, that is, the sub-frames in which MTC communication occurs for that power class node, based on the load of that power class node. A larger load may require more MTC communication and the periodicity may be dynamically adjusted accordingly. A smaller or lighter load may require less MTC communication and the periodicity may be dynamically adjusted accordingly.

The information received by the MTC device from a power class node during a sub-frame includes the transmit (Tx) power of the base station or eNB associated with that power class node. The MTC device may determine, based on this information, the path loss to the base station. Once the path loss is known for one or more base stations, the MTC device may associate with one of those base stations. In one approach, the MTC device may associate with the cell, base station, or power class node that has the smallest path loss. The smaller the path loss, the better UL power consumption for the MTC device. In another approach, the MTC device may associate with the cell, base station, or power class node that has the strongest signal. The stronger the signal, the better DL power consumption because the transmission can be done more quickly. The selection of which approach to take may depend on the traffic profile of the MTC device. For example, for smart meter applications in which data is generally transmitted to the cell or base station, the approach based on the smallest path loss may be more appropriate. On the other hand, for a sprinkler system that receives operating instructions from a base station, the approach based on the strongest signal may be more appropriate. In those instances when the macro cell provides the strongest signal and the small cell or LPN has the smallest path loss, the DL may be decoupled from the UL as illustrated above with reference to FIG. 2B. Again, such a scheme may involve having some coordinating information exchanged among the cells.

Figure 5A:
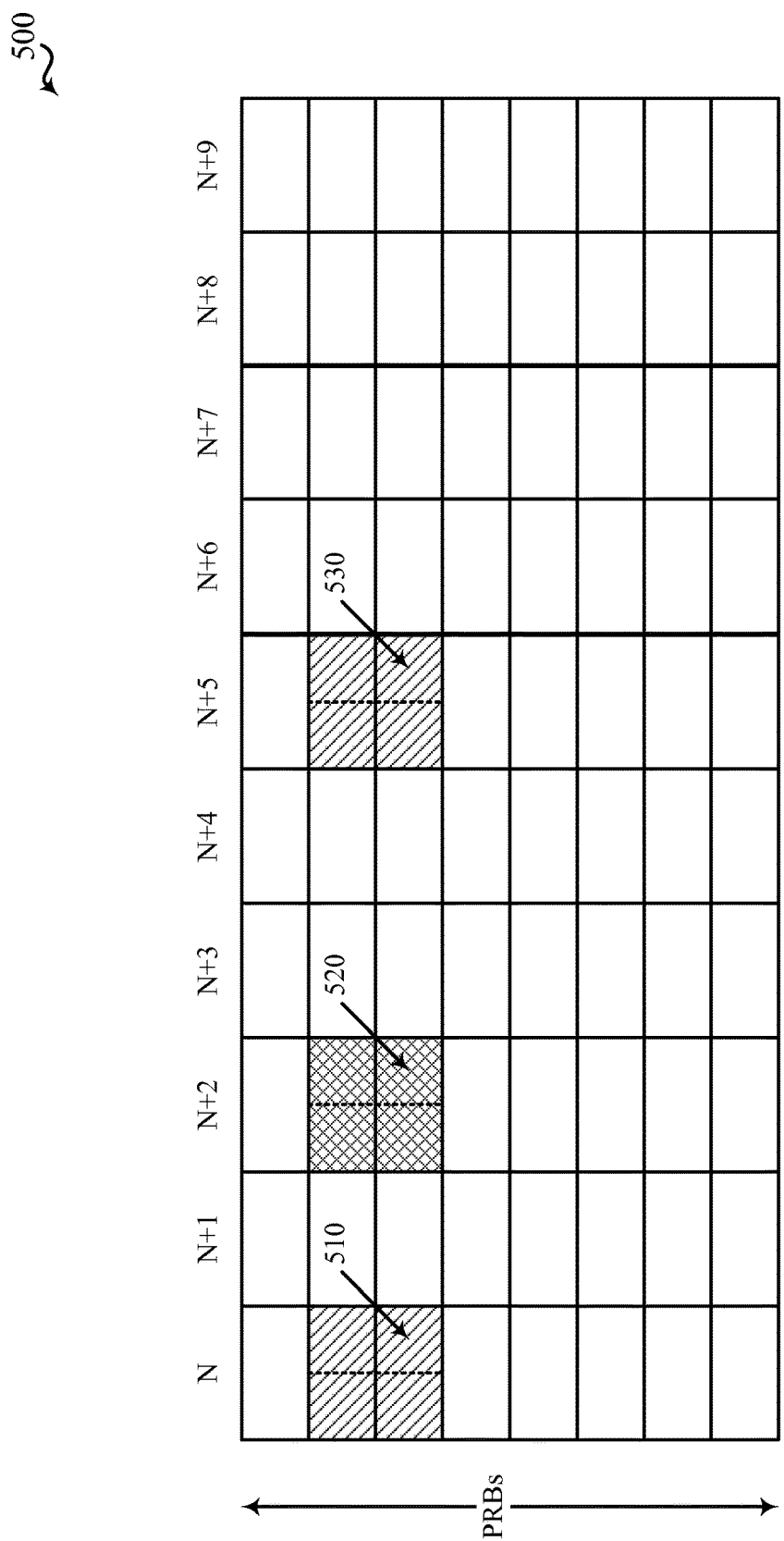
FIG. 5A shows a block diagram that illustrates another example of an association scheme for an MTC device based on new narrowband channels according to various embodiments.
Figure 5B:
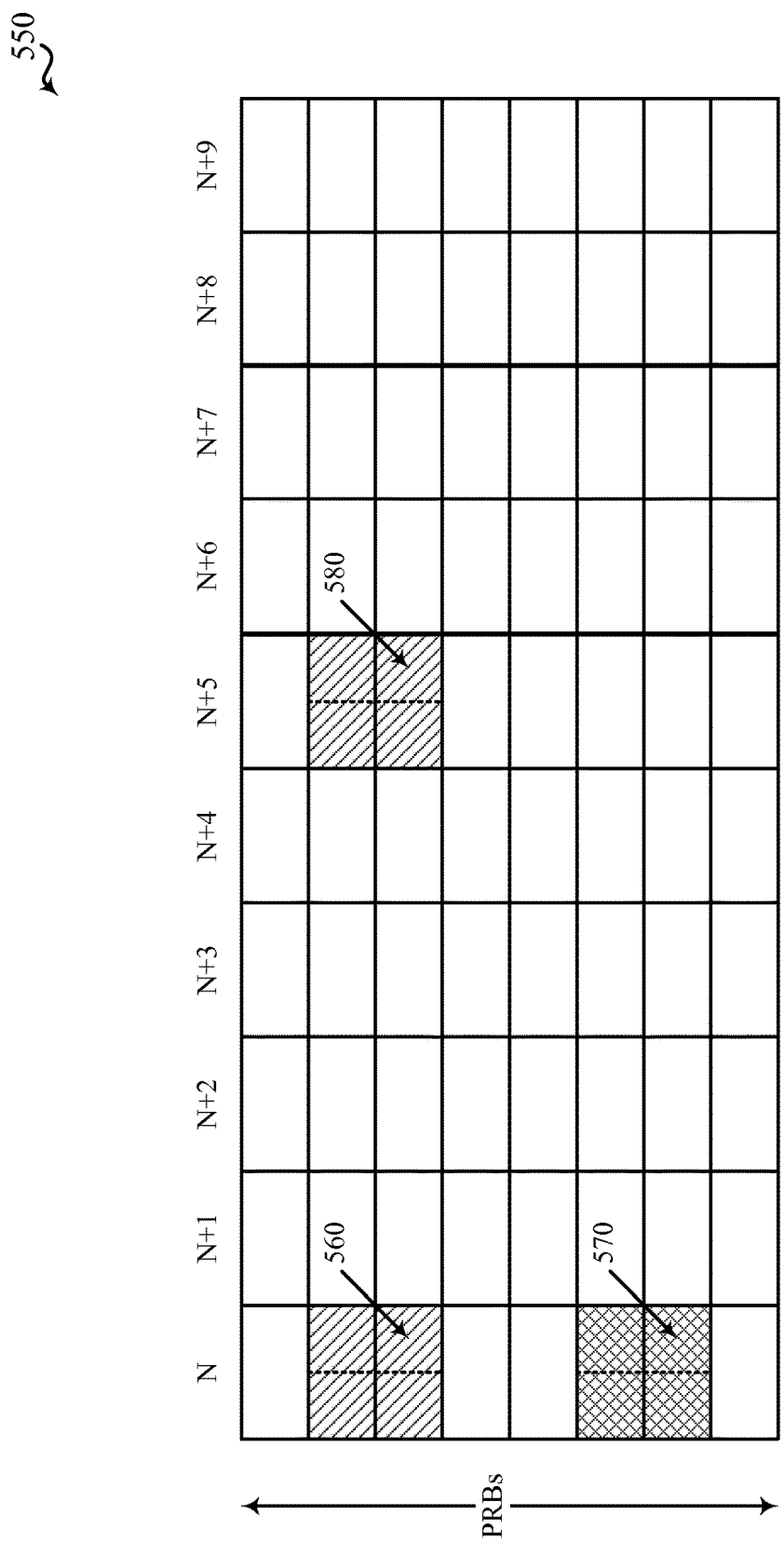
FIG. 5B shows a block diagram that illustrates multiple MTC occasions in a same sub-frame according to various embodiments.

Turning next to FIG. 5A, a diagram 500 is shown that illustrates another association scheme in which the transmit power of the macro cell is reduced for MTC communication. For example, diagram 500 shows that in sub-frames N and N+5, a high power node (e.g., macro cell) may transmit by using sets of MTC PRBs 510 and 530 (diagonal lines), respectively. In sub-frame N+2, a low power node (e.g., small cell) may transmit by using a set of MTC PRBs 520 (cross-hatched). The MTC transmissions from the higher power node, however, are reduced to be at the same power level as the MTC transmissions from low power nodes. Some degree of coordination between the power class nodes may be needed to ensure that the appropriate power levels are used. FIG. 5B shows a diagram 550 that illustrates that the association scheme of FIG. 5A need not involve time-division multiplexing of the MTC PRBs for different power class nodes. For example, diagram 550 shows that in the same sub-frame N, a high power node (e.g., macro cell) may transmit by using a set of MTC PRBs 560 (diagonal lines) and a low power node (e.g., small cell) may also transmit by using a set of MTC PRBs 570 (cross-hatched). Additionally, in sub-frame N+5, the high power node may transmit using a set of MTC PRBs 580 (diagonal lines).

For the examples shown in both FIG. 5A and FIG. 5B, the MTC device may associate to the power class node or cell with the smallest path loss since the strength of the received signals for the cells is more or less the same. In some instances, error vector magnitude (EVM) issues may arise for reduced power MTC communication in macro cells.

Figure 6:
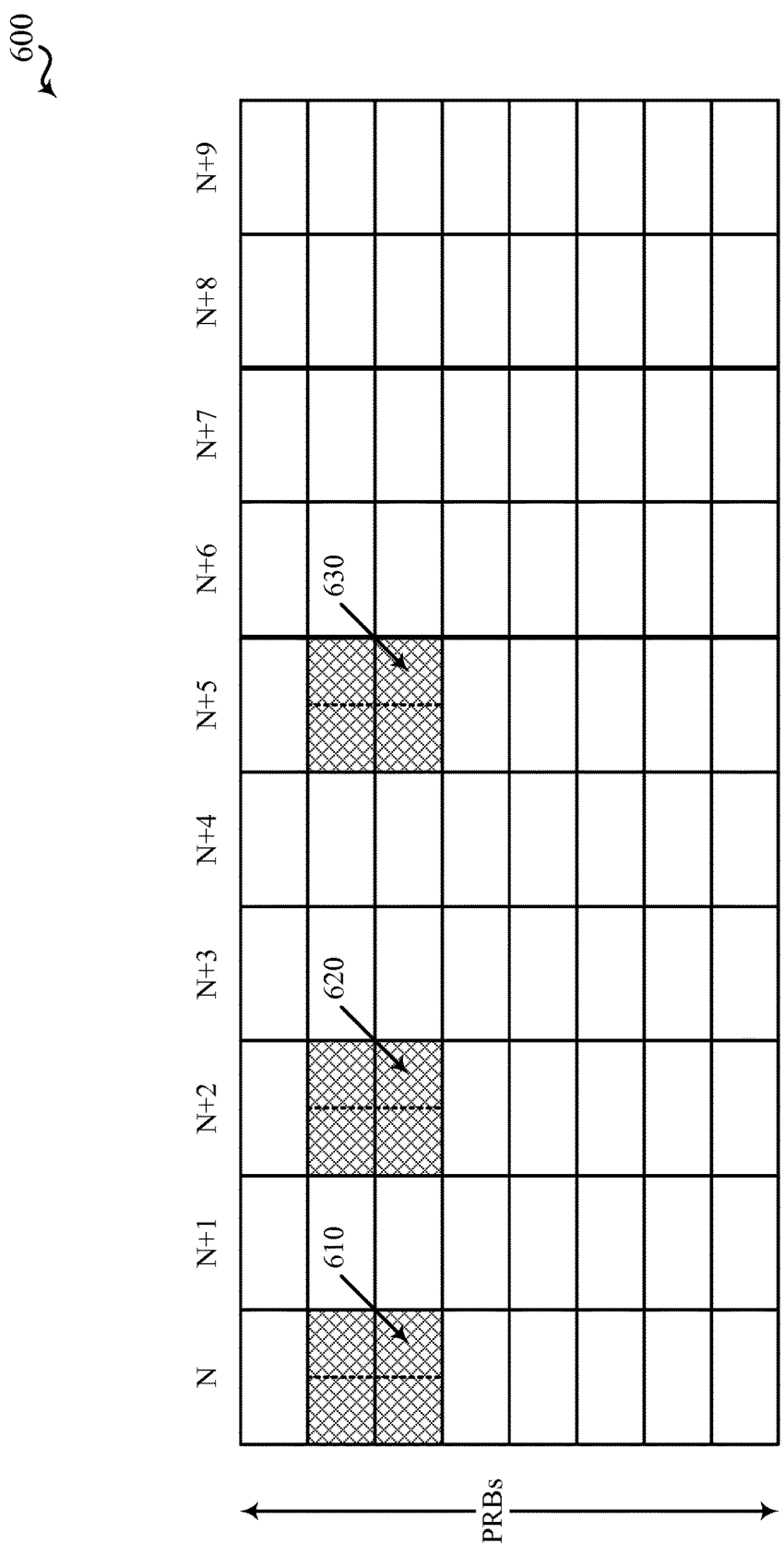
FIG. 6 shows a block diagram that illustrates yet another example of an association scheme for an MTC device based on new narrowband channels according to various embodiments.

Turning next to FIG. 6, a diagram 600 is shown that illustrates yet another association scheme in which the macro cell is silenced or muted for MTC communication and the small cell transmits during the muted or silenced MTC PRBs of the macro cell. For example, diagram 600 shows that in sub-frames N, N+2, and N+5, a low power node (e.g., small cell) may transmit by using sets of MTC PRBs 610, 620, and 630 (cross-hatched) while there are no MTC communications from a high power node (e.g., macro cell). By disabling MTC communications from the high power node, the EVM issues described above may not arise or be minimized. This association scheme effectively results in a homogeneous network of LPNs on the MTC PRBs and the MTC device may associate with, for example, the LPN having the strongest signal received.

Figure 7A:
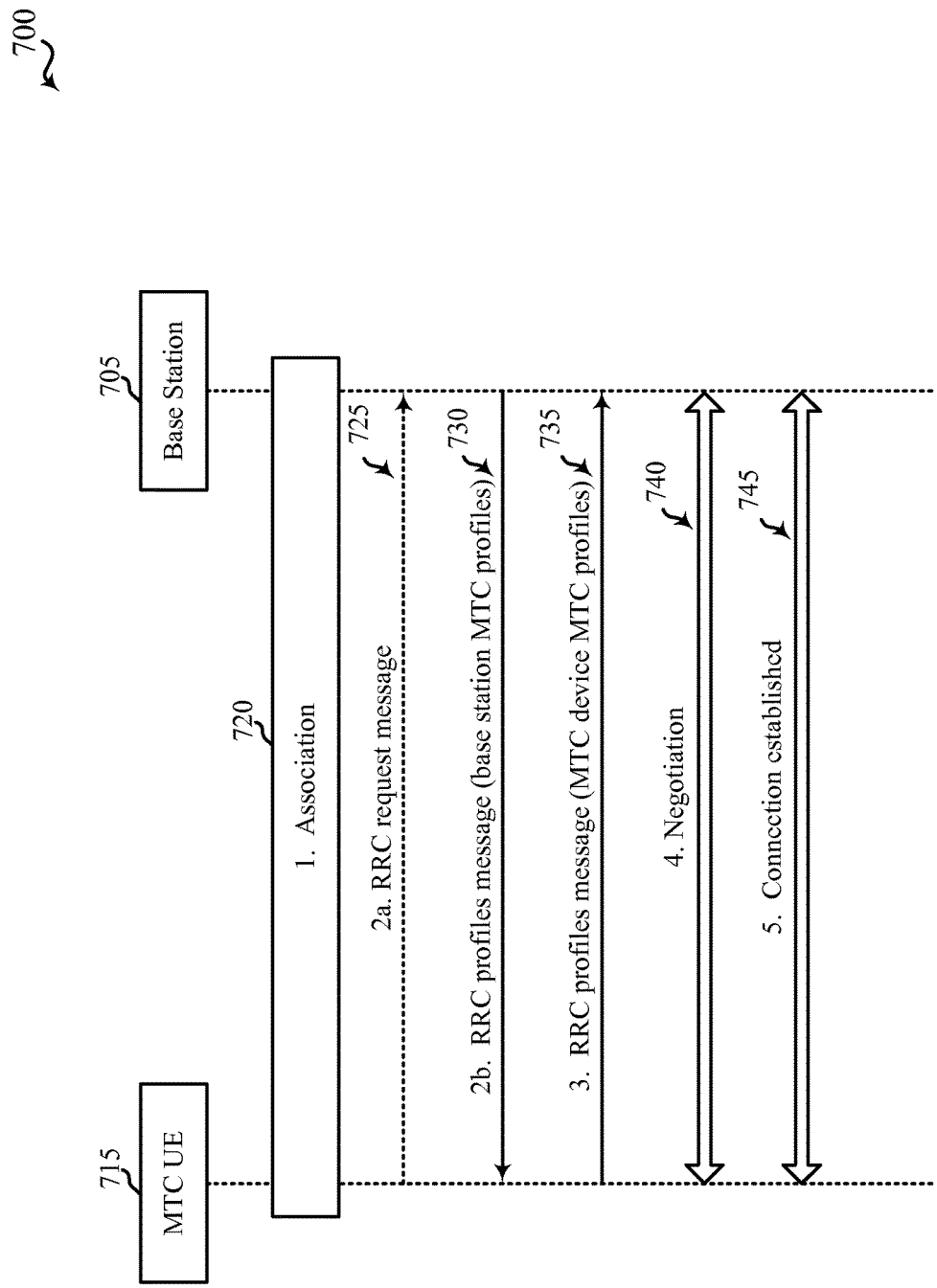
FIG. 7A shows a call flow diagram that illustrates an example of signaling between an MTC device and a base station to establish a connection according to various embodiments.

Turning to FIG. 7A, a diagram 700 is shown that illustrates an example of signaling between an MTC UE 715 and a base station 705 for establishing a connection for MTC communications. The signaling mechanism shown in diagram 700 is between a cell or base station 705 and an MTC UE 715. The base station 705 may be an example of the base stations 105, 205, and 220 of FIG. 1, FIG. 2A, and FIG. 2B. The MTC UE 715 may be an example of the UEs 115 of FIG. 1 and the MTC UEs 215 of FIG. 2A and FIG. 2B.

At 720 (1), an association between the MTC UE 715 and the base station 705 takes place. The association may be based at least in part on one of the association schemes described below with respect to methods 1500, 1600, 1700, and 1800 of FIG. 15, FIG. 16, FIG. 17, and FIG. 18. At 725 (2*a*), the MTC UE 715 may transmit a radio resource control (RRC) message to the base station 705 to request a set of profiles supported by the base station 705 for MTC communication. The RRC message may be referred to as an RRC request message. The MTC UE 715 may transmit the request when the base station 705 has yet to broadcast information about the MTC profiles it supports.

At 730 (2*b*), the base station 705 may transmit an RRC message to the MTC UE 715 that includes information about the set of MTC profiles that the base station 705 supports. The RRC message may be transmitted in response to a request from the MTC UE 715 (e.g., 2*a*) or as part of a scheduled broadcast. The information may include one or more bits that identify the profiles supported. In this case, the MTC UE 715 may be configured to identify the profiles from the one or more bits. Moreover, the RRC message may be a broadcast by the base station 705 and the information about the MTC profiles supported may be included in one or more system information blocks (SIBs) in the broadcast message. The MTC profile information provided by the base station 705 may include various operational parameters including but not limited to the periodicity of MTC communications, the delay budget for MTC communications, and/or the bit rate for MTC communications.

At 735 (3), the MTC UE 715 may transmit an RRC message to the base station 705 that includes information about the set of MTC profiles that the MTC UE 715 supports. This information may include one or more bits that identify the profiles supported. In this case, the base station 705 may be configured to identify the profiles from the one or more bits. The MTC profile information provided by the MTC UE 715 may include various operational parameters including but not limited to the periodicity of MTC communications, the delay budget for MTC communications, the bit rate for MTC communications, and/or security parameters.

Figure 7B:
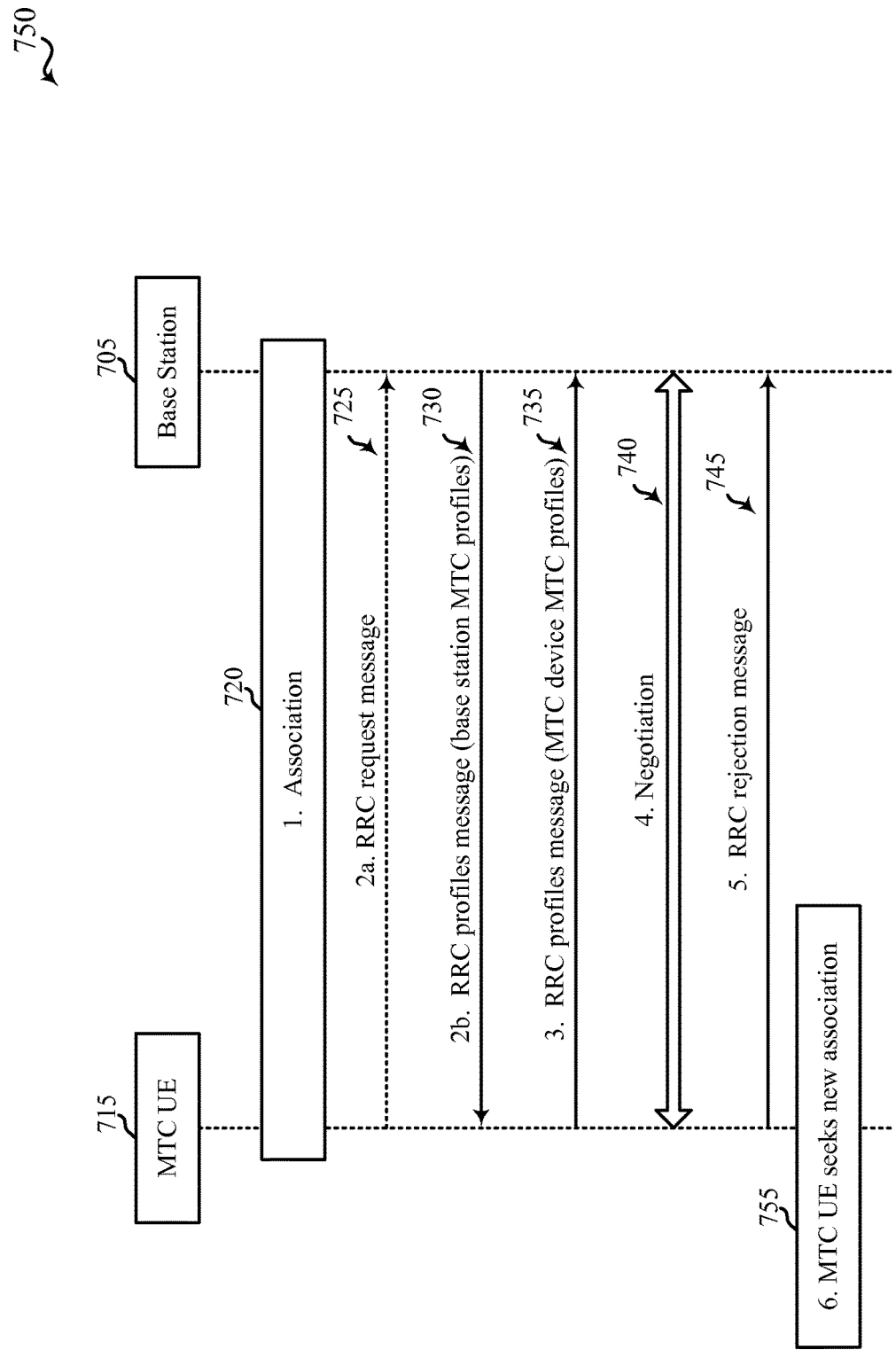
FIG. 7B shows a call flow diagram that illustrates another example of signaling between an MTC device and a base station to establish a connection according to various embodiments.

At 740 (4), the MTC UE 715 and the base station 705 may negotiate and determine a compatible MTC profile with which to establish a connection that will enable MTC communications between the MTC UE 715 and the base station 705. Compatibility may involve having one or more of the operational parameters in an MTC profile supported by the MTC UE 715 match one or more of the operational parameters in an MTC profile supported by the base station 705. At 745 (5), when the results from the negotiation determine that there is at least one compatible MTC profile between the two devices, a connection may be established for MTC communications using a compatible MTC profile. When, for example, more than one compatible profile is found, the negotiation may include the selection of one of the compatible profiles based on one or more of the operational parameters in the profiles. For example, a profile with greater periodicity may be preferred and may be selected for establishing the connection. FIG. 7B shows a diagram 750 that illustrates what may happen when the outcome of the negotiation is that a compatible MTC profile was not found between the two devices. In this case, the MTC UE 715 may transmit an RRC message to the base station 705 rejecting a connection with the base station 705. At 755 (6), the MTC UE 715 may seek a new association with a different cell or base station and may perform one or more of the association schemes described above. When an association occurs, the MTC UE 715 may again attempt to establish a connection for MTC communications with the new associated cell or base station.

Figure 8A:
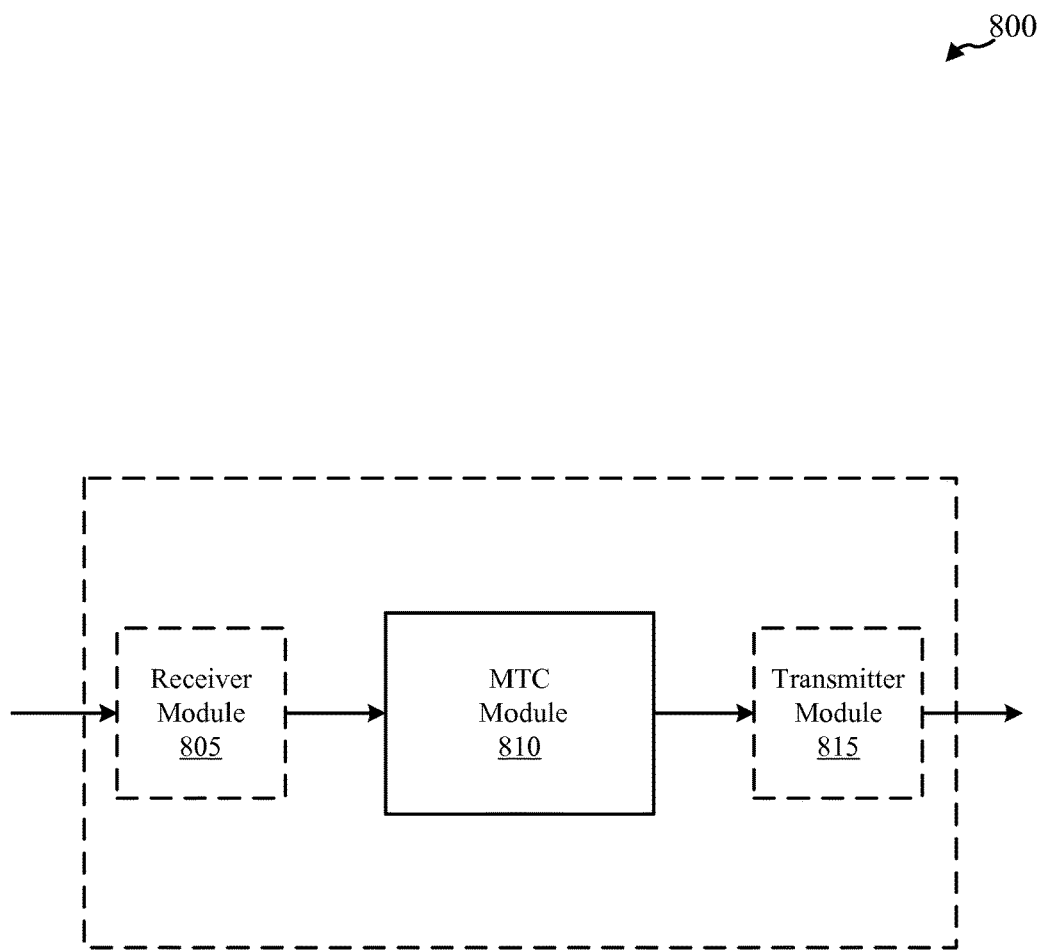
FIG. 8A shows a block diagram that illustrates an example of a device for MTC communications according to various embodiments.

Turning to FIG. 8A, a block diagram is shown that illustrates a device 800 for negotiating and establishing a connection for MTC communications. The device 800 may be an example of one or more aspects of the UEs and MTC UEs described with reference to FIG. 1, FIG. 2A, FIG. 2B, FIG. 7A, FIG. 7B, FIG. 9, and FIG. 11. The device 800 may also be a processor. The device 800 may include a receiver module 805, an MTC module 810, and/or a transmitter module 815. Each of these components may be in communication with each other.

Device 800, through the receiver module 805, the MTC module 810, and/or the transmitter module 815, may be configured to receive a first RRC profiles message from a base station (e.g., base stations 105, 205, 220, 705, 1005, and 1110) or cell, where the first RRC profiles message includes a set of MTC profiles supported by the base station. The first RRC profiles message may be broadcast by the base station after an association or in connection with an association to the base station. The device 800 may be configured to transmit a second RRC profiles message to the base station, where the second RRC profiles message includes a set of MTC profiles supported by an MTC device (e.g., MTC UE). The device 800 may be configured to negotiate and determine an MTC profile in the set supported by the base station that is compatible with an MTC profile in the set supported by the MTC device. The device 800 may be configured to establish a connection with the base station using the compatible MTC profile. The established connection enables MTC communications with the base station.

In some embodiments of the device 800, the device 800 is configured to transmit an RRC request message to the base station to request the set of MTC profiles supported by the base station. The first RRC profiles message is received from the base station in response to the RRC request message. The transmission of the RRC request message may be part of an RRC connection setup message or of an RRC reconfiguration message, for example.

In some embodiments of the device 800, the first RRC profiles message is an RRC message broadcast by the base station, and the set of MTC profiles supported by the base station are included in one or more SIBs in the RRC broadcast message.

In some embodiments of the device 800, each MTC profile in the set supported by the base station indicates one or more of a periodicity for MTC communications, a delay budget for MTC communications, or a bit rate for MTC communications. Similarly, each MTC profile in the set supported by the MTC device indicates one or more of a periodicity for MTC communications, a delay budget for MTC communications, a bit rate for MTC communications, and at least one security parameter.

In some embodiments of the device 800, the device 800 is configured to transmit an RRC rejection message to the base station, where the RRC rejection message indicates that the MTC device rejects a connection with the base station when the negotiation results in incompatible MTC profiles between the MTC device and the base station.

In some embodiments of the device 800, the device 800 is configured to identify each of the MTC profiles in the set supported by the base station from one or more bits received in the first RRC profiles message.

In some embodiments of the device 800, the device 800 is configured to receive an RRC rejection message from the MTC device to indicate that the MTC device rejects a connection with the base station when the negotiation results in incompatible MTC profiles between the MTC device and the base station.

In some embodiments of the device 800, the device 800 is configured to assign one or more bits in the first RRC profiles message to represent the MTC profiles in the set supported by the base station.

In some embodiments of the device 800, the base station is a first base station in a heterogeneous network having multiple base stations that support MTC communications, and the device 800 is configured to transmit to the first base station an RRC rejection message indicating that the MTC device rejects a connection with the first base station when the negotiation results in incompatible MTC profiles between the MTC device and the first base station. The device 800 is also configured to identify a second base station from the heterogeneous network with which the MTC device is to associate next. The first base station may correspond to a small cell in the heterogeneous network, and the second base station may correspond to a macro cell in the heterogeneous network, for example. In another example, the first base station may correspond to a macro cell in the heterogeneous network, and the second base station may correspond to a small cell in the heterogeneous network.

Figure 8B:
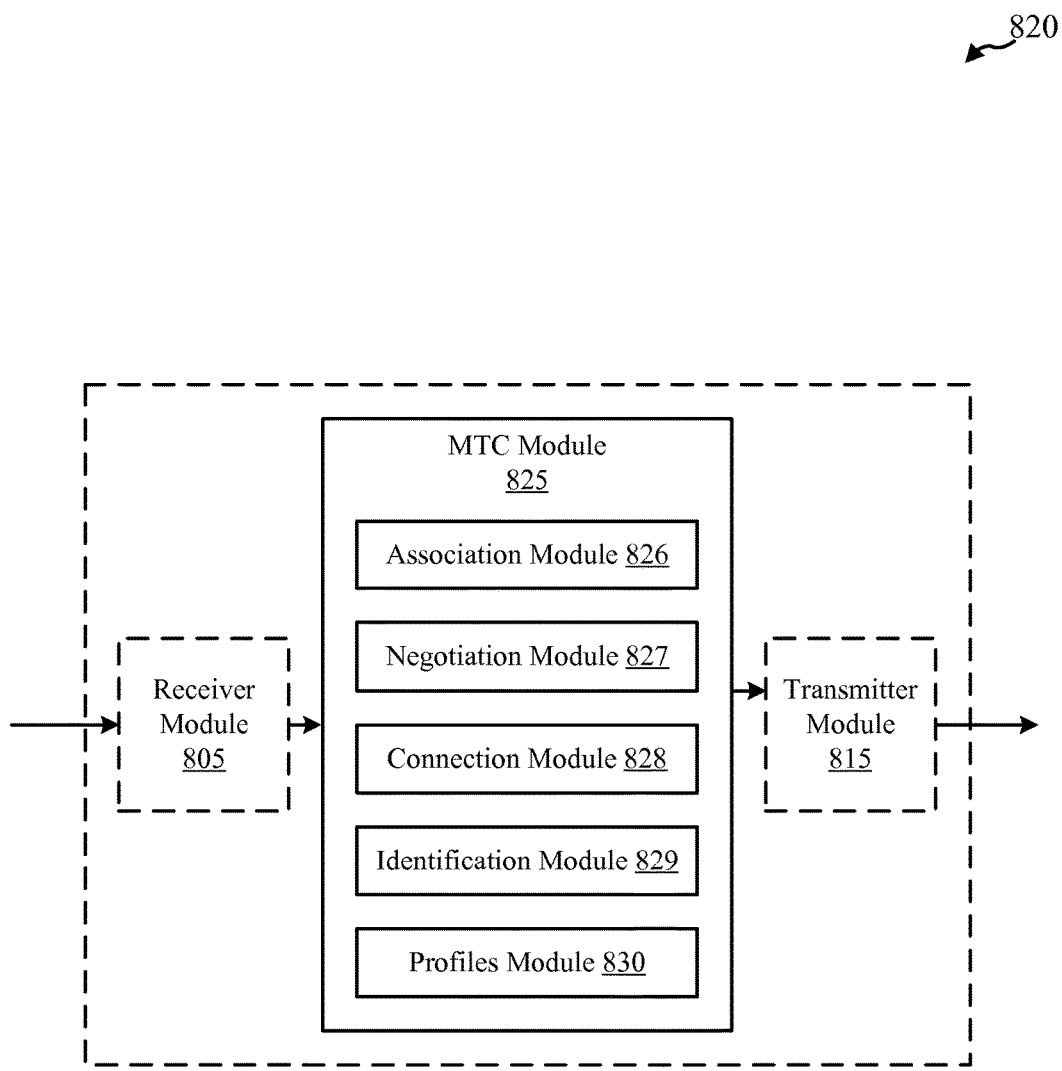
FIG. 8B shows a block diagram that illustrates another example of a device for MTC communications according to various embodiments.

Turning next to FIG. 8B, a block diagram is shown that illustrates a device 820 for negotiating and establishing a connection for MTC communications. The device 820 may be an example of the device 800 of FIG. 8A. The device 820 may also be a processor. The device 820 may include the receiver module 805, an MTC module 825, and/or the transmitter module 815. The MTC module 825 may be an example of the MTC module 810 of FIG. 8A. Each of these components may be in communication with each other.

The MTC module 825 may include an association module 826, a negotiation module 827, a connection module 828, an identification module 829, and a profiles module 830. The association module 826 may be configured to perform various aspects related to one or more of the association schemes described above. The negotiation module 827 may be configured to perform various aspects related to a negotiation for establishing a connection for MTC communications as described above with respect to FIG. 7A and FIG. 7B. The connection module 828 may be configured to perform various aspects related to establishing or rejecting a connection for MTC communications as described above with respect to FIG. 7A and FIG. 7B. The identification module 829 may be configured to perform various aspects related to identifying MTC profiles and/or base stations for association as described above with respect to FIG. 7A and FIG. 7B. The identification module 829 may also perform various aspects related to the assignment of bits for representing MTC profiles. The profiles module 830 may be configured to perform various aspects related to storing and/or providing information about one or more MTC profiles.

Figure 9:
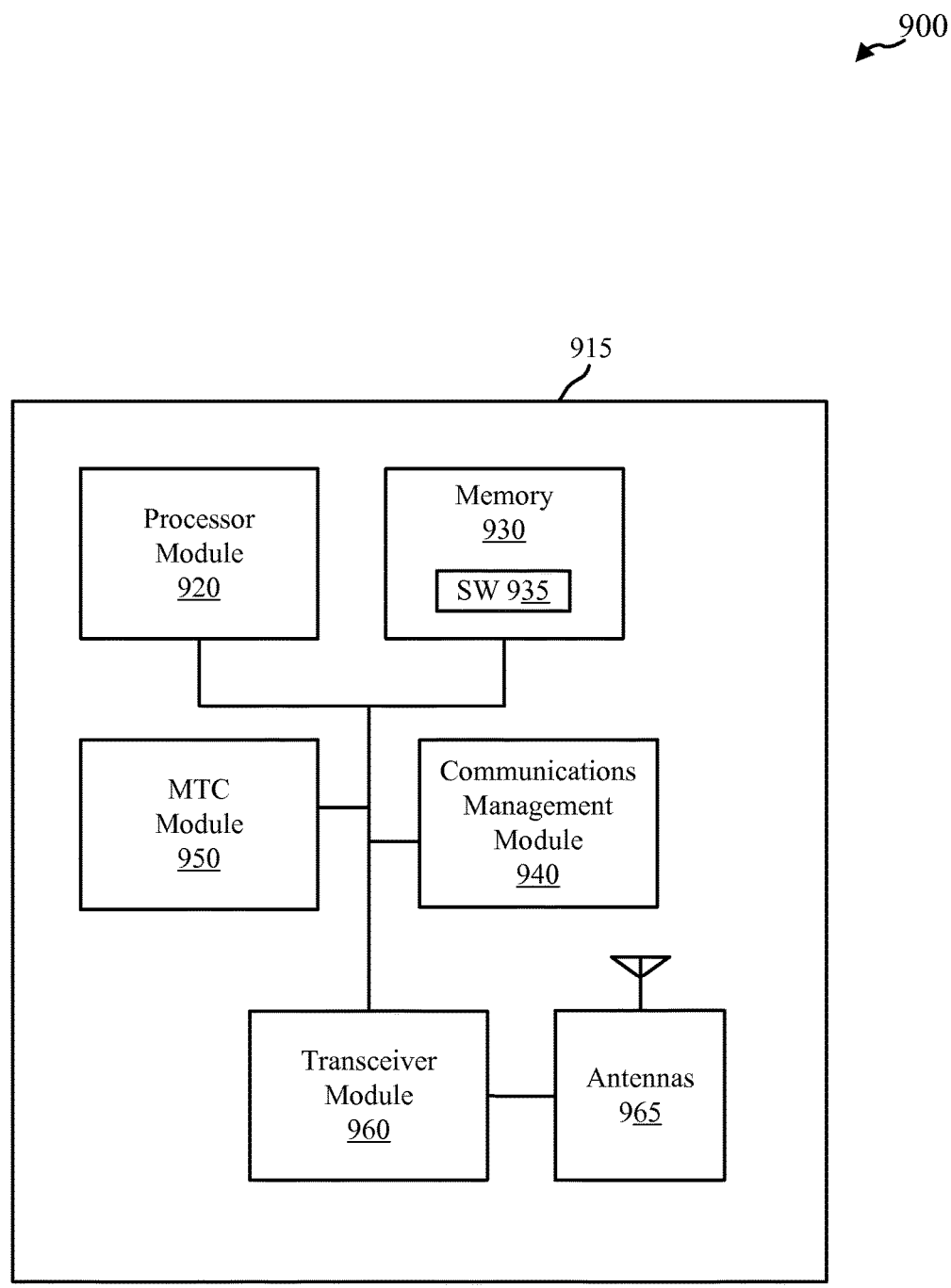
FIG. 9 shows a block diagram that illustrates an example of an MTC device architecture according to various embodiments.

Turning to FIG. 9, a diagram 900 is shown that illustrates an MTC UE 915 configured for MTC communication through a cellular network such as an LTE HetNet. The MTC UE 915 may be a low complexity device with interference management methods that may not support interference cancellation. The MTC UE 915, however, may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The MTC UE 915 may have an internal power supply (not shown), such as a small battery, to facilitate mobile operation. The MTC UE 915 may be an example of the UEs 115 of FIG. 1, and/or the MTC UE 215 of FIG. 2A and FIG. 2B. The MTC UE 915 may be referred to as a wireless communications device, a user equipment, or an MTC device in some cases.

The MTC UE 915 may include antennas 965, a transceiver module 960, a memory 930, and a processor module 920, which each may be in communication, directly or indirectly, with each other (e.g., via one or more buses). The transceiver module 960 may be configured to communicate bi-directionally, via the antennas 965 and/or one or more wired or wireless links, with one or more networks, as described above. For example, the transceiver module 960 may be configured to communicate bi-directionally with base stations 105, 205, 220, 705, 1005, and 1110 of FIG. 1, FIG. 2A, FIG. 2B, FIG. 7A, FIG. 7B, FIG. 10, and FIG. 11. The transceiver module 960 may be implemented as a transmitter module and a separate receiver module. The transceiver module 960 may include a modem configured to modulate the packets and provide the modulated packets to the antennas 965 for transmission, and to demodulate packets received from the antennas 965. While the MTC UE 915 may include a single antenna, there may be embodiments in which the MTC UE 915 may include multiple antennas 965.

The memory 930 may include random access memory (RAM) and read-only memory (ROM). The memory 930 may store computer-readable, computer-executable software code 935 containing instructions that are configured to, when executed, cause the processor module 920 to perform various functions described herein for detecting and locating MTC communication channels and/or performing MTC association schemes, for example. Alternatively, the computer-executable software code 935 may not be directly executable by the processor module 920 but be configured to cause the computer (e.g., when compiled and executed) to perform functions described herein.

The processor module 920 may include an intelligent hardware device, e.g., a central processing unit (CPU) such as those made by Intel® Corporation or AMD®, a microcontroller, an application-specific integrated circuit (ASIC), etc. The processor module 920 may process information received through the transceiver module 960 and/or to be sent to the transceiver module 960 for transmission through the antennas 965. The processor module 920 may handle, alone or in connection with the MTC module 950, various aspects of detecting and locating MTC communication channels and/or performing MTC association schemes. The processor module 920 may also handle, alone or in connection with the MTC module 950, various aspects related to placing the MTC UE 915 in a sleep mode and/or waking up the device for MTC communication with a base station.

According to the architecture of FIG. 9, the MTC UE 915 may further include a communications management module 940. The communications management module 940 may manage communications with other UEs 115 and/or with various base stations (e.g., macro cells, small cells). By way of example, the communications management module 940 may be a component of the MTC UE 915 in communication with some or all of the other components of the MTC UE 915 via a bus (as shown in FIG. 9). Alternatively, functionality of the communications management module 940 may be implemented as a component of the transceiver module 960, as a computer program product, and/or as one or more controller elements of the processor module 920. The MTC UE 915 may also include the MTC module 950, which may be configured to implement, for example, some or all of the functions of the devices 800 and 820 of FIG. 8A and FIG. 8B, respectively.

The components for the MTC UE 915 may be configured to implement aspects discussed above with respect to devices 115, 215, 715, 800, and 820 of FIG. 1, FIG. 2A, FIG. 2B, FIG. 7A, FIG. 7B, FIG. 8A, and FIG. 8B and those aspects may not be repeated here for the sake of brevity. Moreover, the components for the MTC UE 915 may be configured to implement aspects discussed below with respect to methods 1300, 1400, 1600, 1700, 1800, 1900, 2000, and 2100 of FIG. 13. FIG. 14, FIG. 16, FIG. 17 FIG. 18, FIG. 19, FIG. 20, and FIG. 21 respectively, and those aspects may not be repeated here also for the sake of brevity.

The MTC UE 915 may also include the MTC module 950, which as described below, may be configured to handle various aspects of detecting and locating MTC communication channels and/or performing MTC association schemes. The MTC module 950 may be configured to determine the path loss and/or signal strength for one or more MTC communication channels, however, the MTC UE 915 may use a different component (e.g., a detector—not shown) to make the appropriate measurements and/or determinations. The MTC module 950 may also be configured to place the MTC UE 915 in a sleep mode and/or to wake up the device for MTC communication with a base station.

Figure 10:
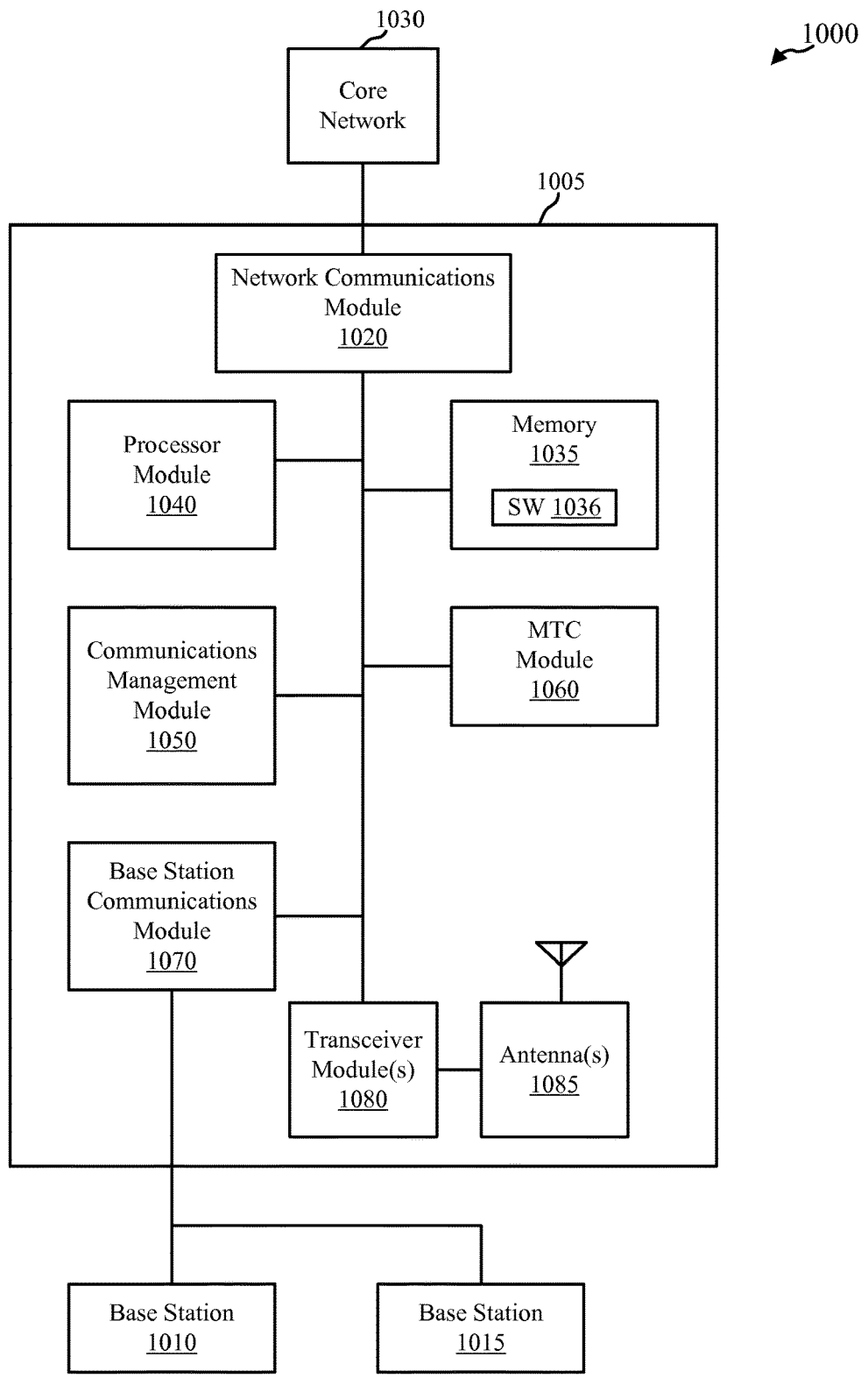
FIG. 10 shows a block diagram that illustrates an example of a base station architecture according to various embodiments.

Turning to FIG. 10, a diagram 1000 is shown that illustrates a base station 1005 configured for MTC communication through a cellular network such as an LTE HetNet. In some embodiments, the base station 1005 may be an example of the base stations 105, 205, and 220 of FIG. 1, FIG. 2A and FIG. 2B. The base station 1005 may include antenna(s) 1085, a transceiver module(s) 1080, a memory 1035, and a processor module 1040, which each may be in communication, directly or indirectly, with each other (e.g., over one or more buses). The transceiver module(s) 1080 may be configured to communicate bi-directionally, via the antenna(s) 1085, with one or more user equipments, including one or more MTC devices such as the MTC UE 915 of FIG. 9. The transceiver module(s) 1080 (and/or other components of the base station 1005) may also be configured to communicate bi-directionally with one or more networks. In some cases, the base station 1005 may communicate with a core network 1030 through a network communications module 1020. The core network 1030 may be an example of the core network 130 of FIG. 1. The base station 1005 may be an example of an eNodeB base station, a Home eNodeB base station, a NodeB base station, and/or a Home NodeB base station. Moreover, the base station 1005 may be an example of a base station in a macro cell or of a base station in a small cell such as an LPN.

The base station 1005 may also communicate with other base stations, such as the base station 1010 and the base station 1015. Each of the base stations 1005, 1010, and 1015 may communicate with a user equipment using different wireless communications technologies, such as different Radio Access Technologies. In some cases, the base station 1005 may communicate with other base stations using a base station communications module 1070. In some embodiments, the base station communications module 1070 may provide an X2 interface within an LTE wireless communication technology to provide communication between some of the base stations. This interface may allow exchanges of messages related to coordinating information for various types of MTC association schemes. In some embodiments, the base station 1005 may communicate with other base stations through the core network 1030.

The memory 1035 may include random access memory (RAM) and read-only memory (ROM). The memory 1035 may also store computer-readable, computer-executable software code 1036 containing instructions that are configured to, when executed, cause the processor module 1040 to perform various functions described various functions described herein for supporting one or more MTC communication channels, indicating properties of the MTC communication channels through the PBCH, and/or performing MTC association schemes, for example. Alternatively, the computer-executable software code 1036 may not be directly executable by the processor module 1040 but be configured to cause the computer, e.g., when compiled and executed, to perform functions described herein.

The processor module 1040 may include an intelligent hardware device, e.g., a central processing unit (CPU) such as those made by Intel® Corporation or AMD®, a microcontroller, an application-specific integrated circuit (ASIC), etc. The processor module 1040 may process information received through the transceiver module(s) 1080, the base station communications module 1070, and/or the network communications module 1020. The processor module 1040 may also process information to be sent to the transceiver module 960 for transmission through the antennas 965, to the base station communications module 1070, and/or to the network communications module 1020. The processor module 1040 may handle, alone or in connection with the MTC module 1060, various aspects of supporting one or more MTC communication channels, indicating properties of the MTC communication channels by assigning one or more bits for that purpose through the PBCH, and/or performing MTC association schemes. The processor module 840 may also handle, alone or in connection with the MTC module 1060, various aspects of adjusting the period of MTC transmissions and/or the power of the MTC transmissions, including disabling or muting MTC transmissions during certain sub-frames. The processor module 1040 may also handle, alone or in connection with the MTC module 1060, various aspects described herein for negotiating and establishing a connection for MTC communications based on MTC profiles of the base station 1005 and an associated MTC UE.

The transceiver module(s) 1080 may include a modem configured to modulate the packets and provide the modulated packets to the antenna(s) 1085 for transmission, and to demodulate packets received from the antenna(s) 1085. The transceiver module(s) 1080 may be implemented as a transmitter module and a separate receiver module.

According to the architecture of FIG. 10, the base station 1005 may further include a communications management module 1050. The communications management module 1050 may manage communications with other base stations. By way of example, the communications management module 1050 may be a component of the base station 1005 in communication with some or all of the other components of the base station 1005 via a bus (as shown in FIG. 10). Alternatively, functionality of the communications management module 1050 may be implemented as a component of the transceiver module(s) 1080, as a computer program product, and/or as one or more controller elements of the processor module 1040. The base station 1005 may also include the MTC module 1060, which may be configured to implement, for example, some or all of the functions of the devices 800 and 820 of FIG. 8A and FIG. 8B, respectively The components for the base station 1005 may be configured to implement aspects discussed above with respect to devices 105, 205, 220, 705 of FIG. 1, FIG. 2A, FIG. 2B, FIG. 7A and FIG. 7B and those aspects may not be repeated here for the sake of brevity. Moreover, the components for the base station 1005 may be configured to implement aspects discussed below with respect to methods 1200, 1500, 2200, 2300, and 2400 of FIG. 12, FIG. 15, FIG. 22, FIG. 23, and FIG. 24, respectively, and those aspects may not be repeated here also for the sake of brevity.

The base station 1005 may also include the MTC module 1060, which as described above, may be configured to handle various aspects of supporting one or more MTC communication channels, indicating properties of the MTC communication channels by assigning one or more bits for that purpose through the PBCH, and/or performing MTC association schemes. The MTC module 1060 may also be configured to adjust the period of MTC transmissions and/or the power of the MTC transmissions, including disabling or muting MTC transmissions during certain sub-frames.

Figure 11:
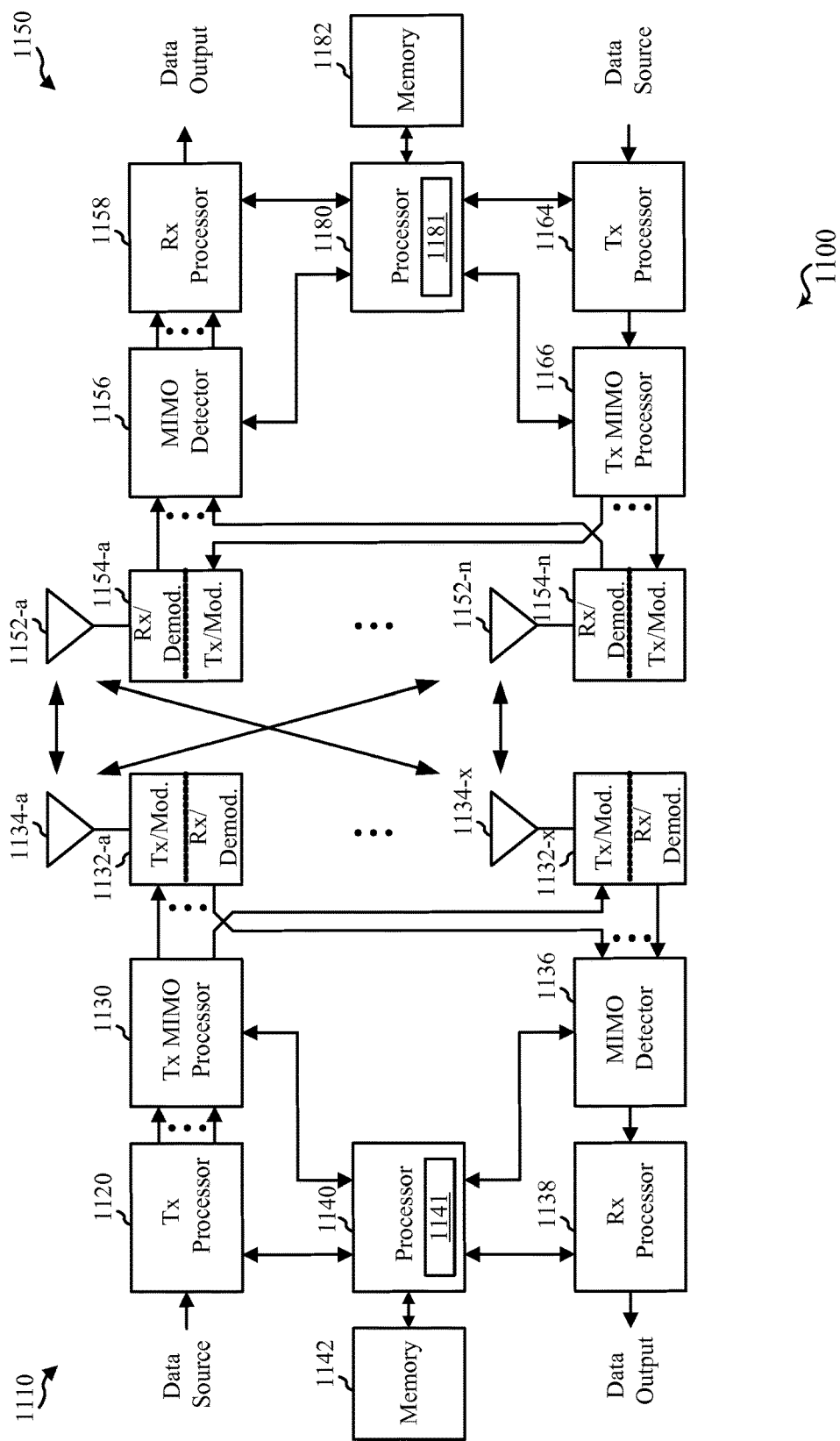
FIG. 11 shows a block diagram that illustrates an example of a multiple-input multiple-output (MIMO) communications system according to various embodiments.

Turning now to FIG. 11, a block diagram of a multiple-input multiple-output (MIMO) wireless communications system 1100 is shown including a base station 1110 and a mobile device 1150. The base station 1110 may be an example of the base stations 105 of FIG. 1, the base stations 205, 220 of FIG. 2A, FIG. 2B, the base station 705 of FIG. 7A and FIG. 7B, and/or the base station 1005 of FIG. 10, respectively, while the mobile device 1150 may be an example of the UEs 115 of FIG. 1, the MTC devices or MTC UEs 215 of FIG. 2A and FIG. 2B, the MTC UE 715 of FIG. 7A and FIG. 7B, and/or the MTC UE 915 of FIG. 9. The wireless communications system 1100 may illustrate aspects of the wireless communications system 100 of FIG. 1 and those portions of the wireless communications system 100 shown in FIG. 2A and FIG. 2B. Moreover, the wireless communications system 1100 may illustrate aspects of the MTC UE 915 of FIG. 9 and the base station 1005 of FIG. 10. The base station 1110 may be equipped with antennas 1134-a through 1134-x, and the mobile device 1150 may be equipped with antennas 1152-a through 1152-n. In the wireless communications system 1100, the base station 1110 may be able to send data over multiple communication links at the same time. Each communication link may be called a "layer" and the "rank" of the communication link may indicate the number of layers used for communication. For example, in a 2×2 MIMO system where base station 1110 transmits two "layers," the rank of the communication link between the base station 1110 and the mobile device 1150 is two.

At the base station 1110, a transmit (Tx) processor 1120 may receive data from a data source. The transmit processor 1120 may process the data. The transmit processor 1120 may also generate reference symbols, and a cell-specific reference signal. A transmit (Tx) MIMO processor 1130 may perform spatial processing (e.g., precoding) on data symbols, control symbols, and/or reference symbols, if applicable, and may provide output symbol streams to the transmit modulator/demodulators 1132-a through 1132-x. Each modulator/demodulator 1132 may process a respective output symbol stream (e.g., for OFDM, etc.) to obtain an output sample stream. Each modulator/demodulator 1132 may further process (e.g., convert to analog, amplify, filter, and upconvert) the output sample stream to obtain a downlink (DL) signal. In one example, DL signals from modulator/demodulators 1132-a through 1132-x may be transmitted via the antennas 1134-a through 1134-x, respectively. In some embodiments, the DL signals include reserved PBCH bits that indicate one or more properties of a channel(s) supported by the base station 1110 for MTC.

At the mobile device 1150, the mobile device antennas 1152-a through 1152-n may receive the DL signals from the base station 1110 and may provide the received signals to the modulator/demodulators 1154-a through 1154-n, respectively. The DL signals may include the reserved PBCH bits that indicate one or more properties of the channel(s) supported by the base station 1110 for MTC. Each modulator/demodulator 1154 may condition (e.g., filter, amplify, downconvert, and digitize) a respective received signal to obtain input samples. Each modulator/demodulator 1154 may further process the input samples (e.g., for OFDM, etc.) to obtain received symbols. A MIMO detector 1156 may obtain received symbols from all the modulator/demodulators 1154-a through 1154-n, perform MIMO detection on the received symbols if applicable, and provide detected symbols. A receive (Rx) processor 1158 may process (e.g., demodulate, deinterleave, and decode) the detected symbols, providing decoded data for the mobile device 1150 to a data output, and provide decoded control information to a processor 1180, or memory 1182. The processor 1180 may include a module or function 1181 that may control various aspects described above for MTC association schemes, including but not limited to, processing information in the reserved bits of the PBCH, locating and detecting MTC communication channel(s), communicating through one or more MTC communication channels, handling the determination and comparison of channel metrics associated with the MTC communication channel(s), enabling and disabling wake up and sleep modes, and selecting a cell for association. The processor 1180 may also include a module or function 1181 that may control various aspects described herein for a mechanism to negotiate and establish a connection for MTC communications based on the MTC profiles supported by the mobile device 1150 and the base station 1110.

On the uplink (UL), at the mobile device 1150, a transmit (Tx) processor 1164 may receive and process data from a data source. The transmit processor 1164 may also generate reference symbols for a reference signal. The symbols from the transmit processor 1164 may be precoded by a transmit (Tx) MIMO processor 1166 if applicable, further processed by the modulator/demodulators 1154-a through 1154-n (e.g., for SC-FDMA, etc.), and be transmitted to the base station 1110 in accordance with the transmission parameters received from the base station 1110. At the base station 1110, the UL signals from the mobile device 1150 may be received by the antennas 1134, processed by the modulator/demodulators 1132, detected by a MIMO detector 1136 if applicable, and further processed by a receive processor. The receive (Rx) processor 1138 may provide decoded data to a data output and to the processor 1140. The processor 1140 may include a module or function 1141 that may control various aspects described above for MTC association schemes, including but not limited to, assigning information in the reserved bits of the PBCH that indicate properties of MTC communication channel(s), supporting one or more MTC communication channels, exchanging coordinating information with one or more base stations, and controlling transmit power levels for MTC communication, including muting or disabling MTC transmissions during certain PRBs. The components of the base station 1110 may, individually or collectively, be implemented with one or more Application Specific Integrated Circuits (ASICs) adapted to perform some or all of the applicable functions in hardware. Each of the noted modules may be a means for performing one or more functions related to operation of the wireless communications system 1100. Similarly, the components of the mobile device 1150 may, individually or collectively, be implemented with one or more Application Specific Integrated Circuits (ASICs) adapted to perform some or all of the applicable functions in hardware. Each of the noted components may be a means for performing one or more functions related to operation of the wireless communications system 1100.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. At the Physical layer, the transport channels may be mapped to Physical channels.

Figure 12:
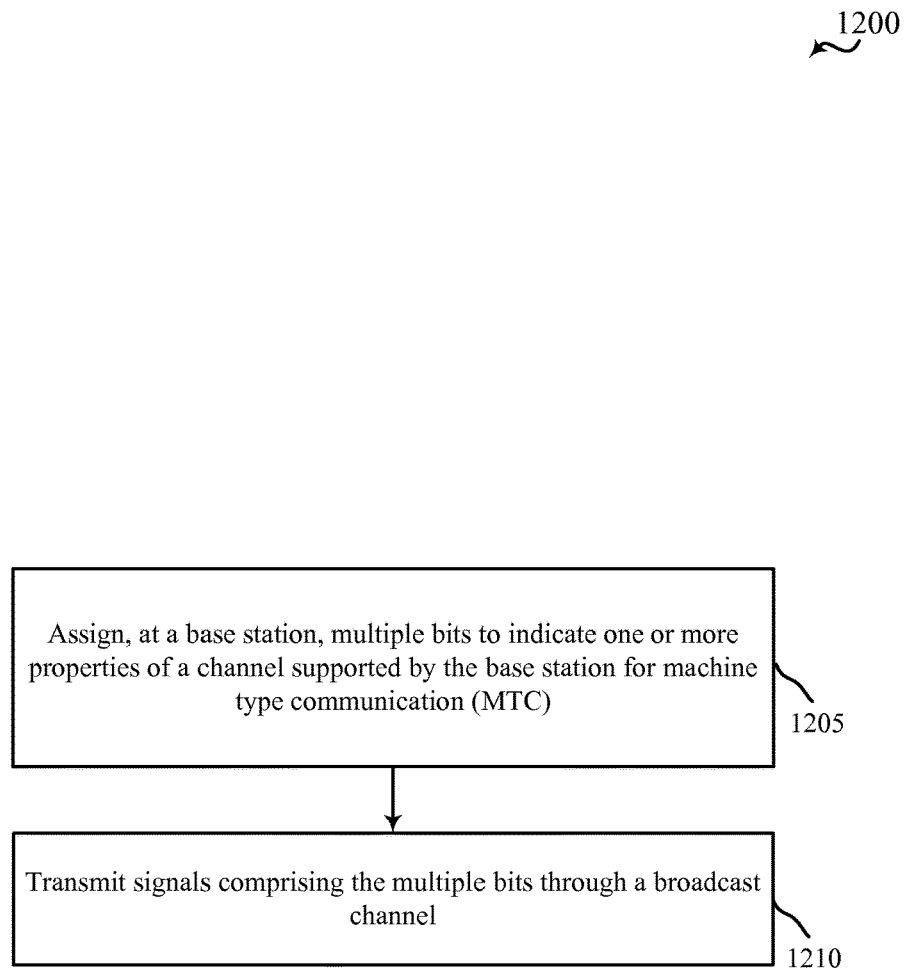
FIG. 12 is a flowchart of an example of a method for bootstrapping a narrowband MTC channel for communication according to various embodiments.

Turning next to FIG. 12, a flowchart is shown of an example method 1200 for bootstrapping a narrowband channel for MTC communication. The method 1200 may be performed using, for example, the wireless communications system 100 of FIG. 1 and those portions illustrated in FIG. 2A and FIG. 2B; and/or the base stations 105, 205, 220, 705, and 1005 of FIG. 1, FIG. 2A, FIG. 2B, FIG. 7A, FIG. 7B, and FIG. 10.

At block 1205, one or more bits may be assigned, at a base station, to indicate one or more properties of a channel supported by the base station for MTC. At block 1210, signals comprising the one or more bits are transmitted through a broadcast channel (e.g., PBCH).

In some embodiments of the method 1200, the channel for MTC has a corresponding set of resource blocks, and the one or more properties identify a frequency offset of the set of resource blocks. In another embodiment, the channel for MTC has a corresponding set of resource blocks, and the one or more properties identify a position of the set of resource blocks in different sub-frames. In another embodiment, the channel for MTC has a corresponding set of resource blocks, the base station supports one or more additional channels for MTC, each of the one or more additional channels for MTC has a corresponding set of resource blocks different from those of any other channel supported by the base station, and the one or more properties identify a position of each set of resource blocks in a same sub-frame. In yet another embodiment, the one or more properties identify one or more time periods during which the base station supports the channel for MTC.

Figure 13:
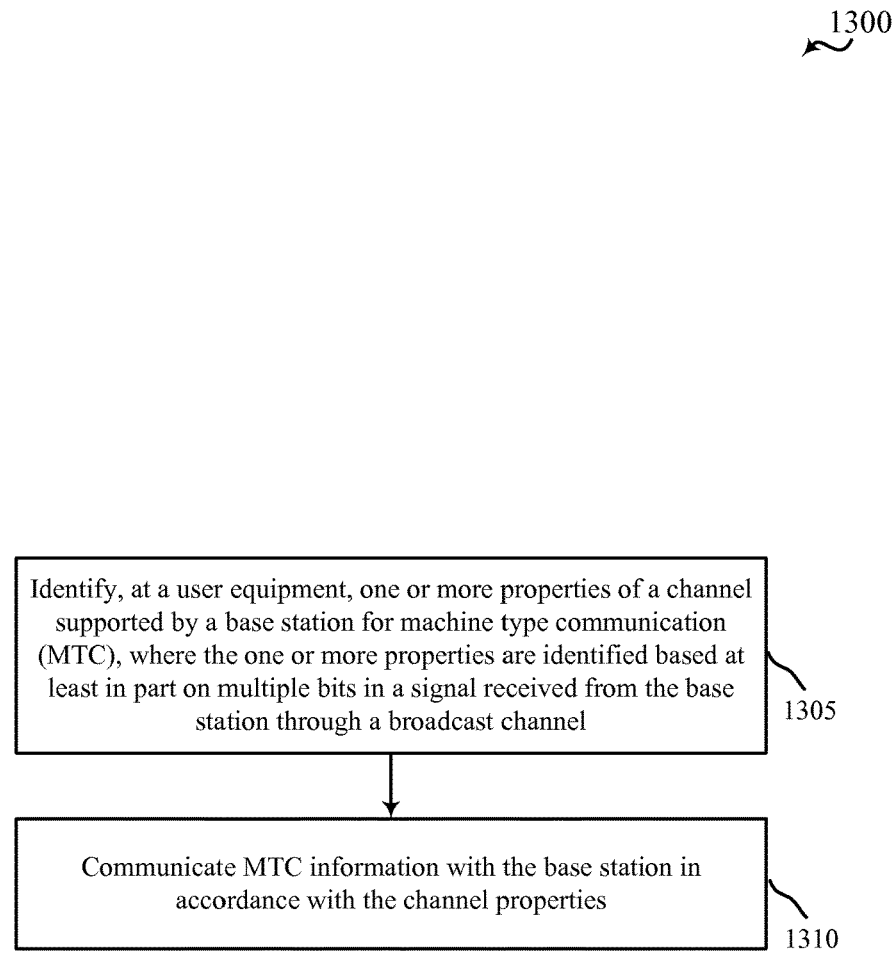
FIG. 13 is a flowchart of another example of a method for bootstrapping a narrowband MTC channel for communication according to various embodiments.

Turning to FIG. 13, a flowchart is shown of an example method 1300 for bootstrapping a narrowband channel for MTC communication. The method 1300 may be performed using, for example, the wireless communications system 100 of FIG. 1 and those portions illustrated in FIG. 2A and FIG. 2B; and/or the MTC UEs 115, 215, 715, and 915 of FIG. 1, FIG. 2A, FIG. 2B, FIG. 7A, FIG. 7B, and FIG. 9.

At block 1305, one or more properties of a channel supported by a base station for MTC are identified at a user equipment, where the one or more properties are identified based at least in part on one or more bits in a signal received from the base station through a broadcast channel (e.g., PBCH). At block 1310, MTC information is communicated with the base station in accordance with the one or more channel properties.

In some embodiments of the method 1300, the channel for MTC has a corresponding set of resource blocks, and the one or more properties identify a frequency offset of the set of resource blocks. In another embodiment, the channel for MTC has a corresponding set of resource blocks, and the one or more properties identify a position of the set of resource blocks in different sub-frames. In yet another embodiment, the channel for MTC has a corresponding set of resource blocks, the base station supports one or more additional channels for MTC, each of the one or more additional channels for MTC has a corresponding set of resource blocks different from those of any other channel supported by the base station, and the one or more properties identify a position of each set of resource blocks in a same sub-frame.

In some embodiments of the method 1300, the method includes selecting between a first set of resource blocks and a second set of resource blocks from the one or more additional sets of resource blocks for communicating MTC information with the base station. The selecting may include identifying a particular bit in a unique identifier of the user equipment and selecting between the first set of resource blocks and the second set of resource blocks based on a value of the bit. In another embodiment, the one or more properties identify one or more time periods during which the base station supports the channel for MTC and the method includes waking up the user equipment for communicating MTC information with the base station in accordance with the one or more time periods.

Figure 14:
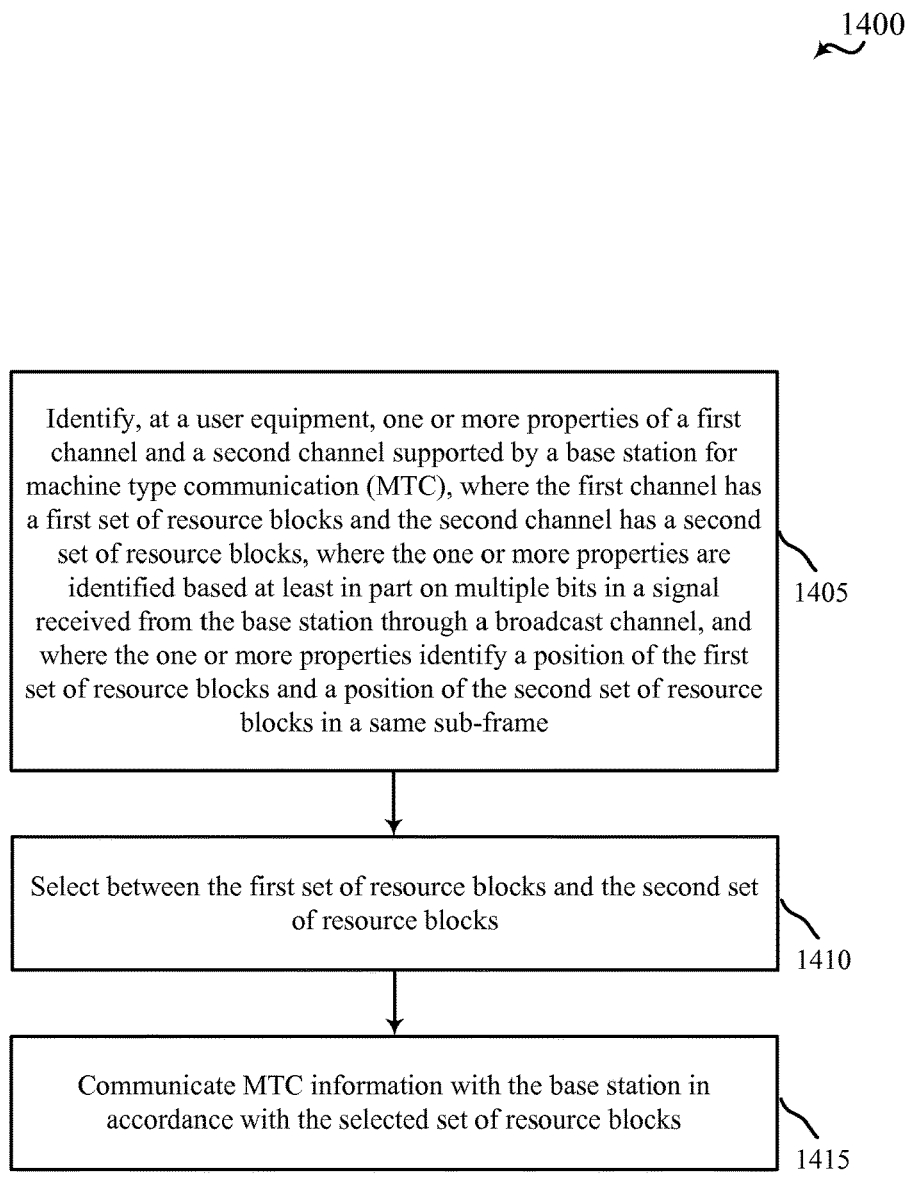
FIG. 14 is a flowchart of yet another example of a method for bootstrapping a narrowband MTC channel for communication according to various embodiments.

Turning next to FIG. 14, a flowchart is shown of an example method 1400 for bootstrapping a narrowband channel for MTC communication. The method 1400, like the method 1300 above, may be performed using, for example, the wireless communications system 100 of FIG. 1 and those portions illustrated in FIG. 2A and FIG. 2B; and/or the MTC UEs 115, 215, 715, and 915 of FIG. 1, FIG. 2A, FIG. 2B, FIG. 7A, FIG. 7B, and FIG. 9.

At block 1405, one or more properties of a first channel and a second channel supported by a base station for MTC are identified at a user equipment, where the first channel has a first set of resource blocks and the second channel has a second set of resource blocks, where the one or more properties are identified based at least in part on one or more bits in a signal received from the base station through a broadcast channel (e.g., PBCH), and where the one or more properties identify a position of the first set of resource blocks and a position of the second set of resource blocks in a same sub-frame. At block 1410, a selection is made between the first set of resource blocks and the second set of resource blocks. At block 1415, MTC information is communicated with the base station in accordance with the selected set of resource blocks.

Figure 15:
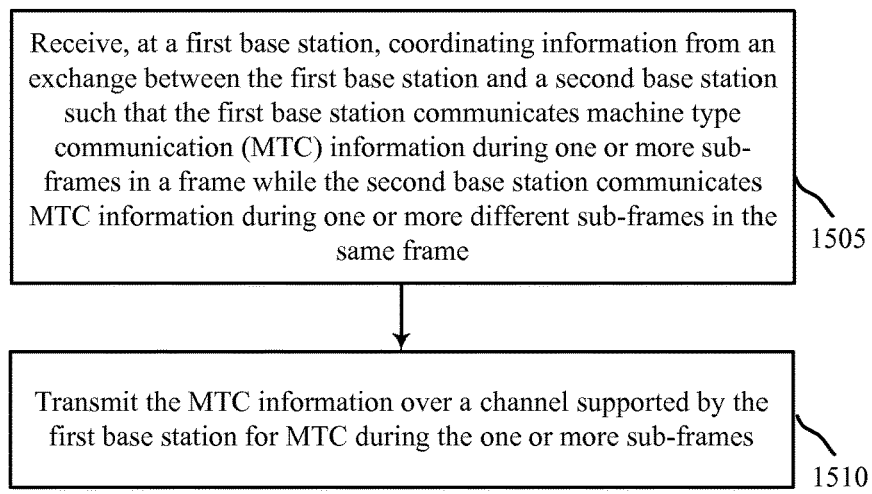
FIG. 15 is a flowchart of an example of a method for an MTC association scheme according to various embodiments.

Turning to FIG. 15, a flowchart is shown of an example method 1500 for an MTC association scheme. The method 1500 may be performed using, for example, the wireless communications system 100 of FIG. 1 and those portions illustrated in FIG. 2A and FIG. 2B; and/or the base stations 105, 205, 220, 705, and 1005 of FIG. 1, FIG. 2A, FIG. 2B, FIG. 7A, FIG. 7B, and FIG. 10.

At block 1505, coordinating information is received at a first base station from an exchange between the first base station and a second base station such that the first base station communicates MTC information during one or more sub-frames in a frame while the second base station communicates MTC information during one or more different sub-frames in the same frame. At block 1510, MTC information is transmitted over a channel supported by the first base station for MTC during the one or more sub-frames.

In some embodiments of the method 1500, the first base station corresponds to a small cell (e.g., LPN) in a heterogeneous network and the second base station corresponds to a macro cell in the heterogeneous network. In another embodiment, the method includes assigning a first set of resource blocks for communicating the MTC information during one of the one or more sub-frames, and assigning a second set of resource blocks, different from the first set of resource blocks, for communicating the MTC information during another of the one of more sub-frames. In another embodiment, the method includes adjusting a period for communicating the MTC information by the first base station based at least in part on a load of the first base station. In yet another embodiment, the second base station is disabled such that no information is communicated during a set of resource blocks assigned for MTC during the one or more different sub-frames, and the method includes enabling the first base station to communicate MTC information during the set of resources in the one or more different sub-frames. In yet another embodiment, based at least in part on the coordinating information, the first base station and the second base station communicate MTC information at substantially the same power in corresponding sets of resource blocks assigned for MTC.

Figure 16:
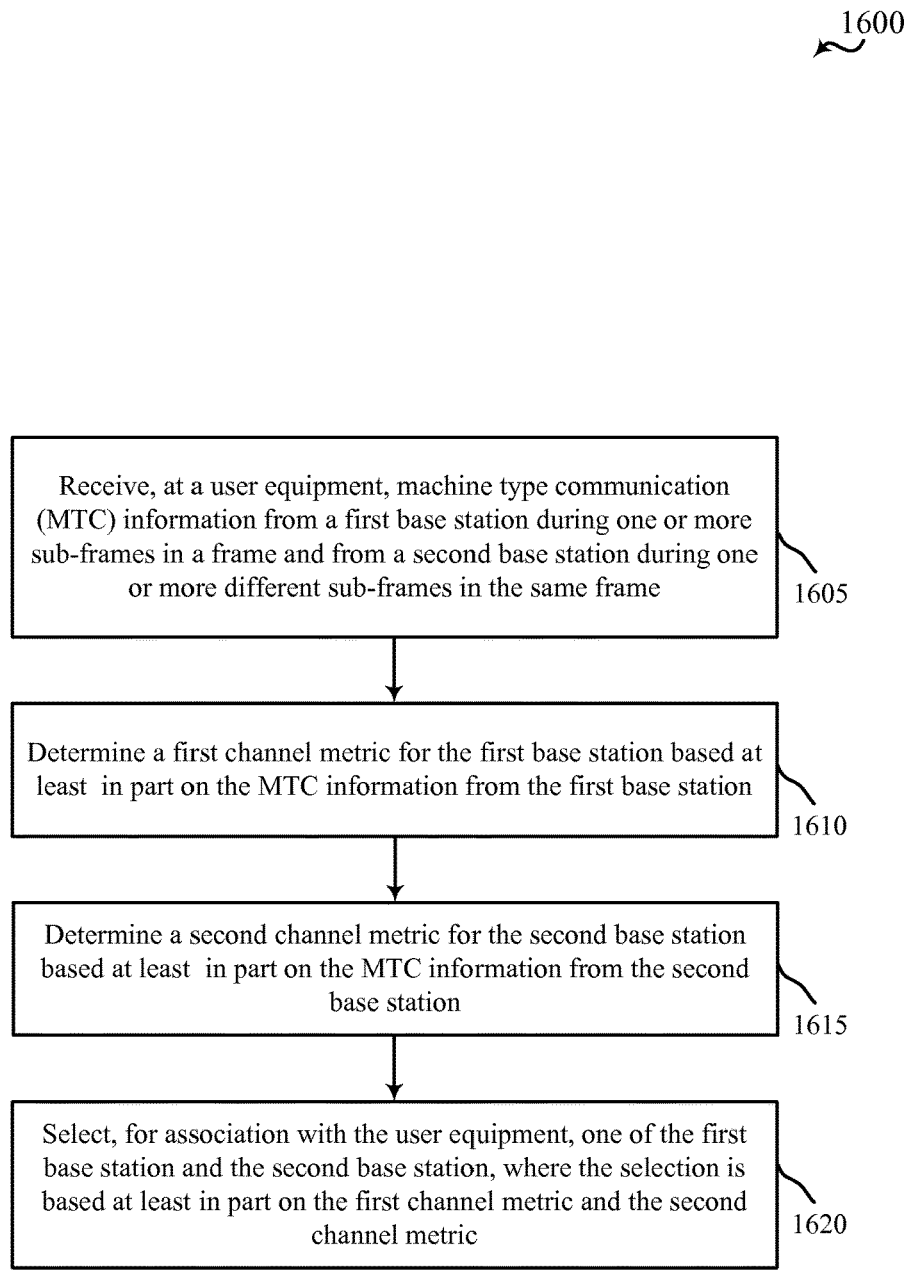
FIG. 16 is a flowchart of another example of a method for an MTC association scheme according to various embodiments.

Turning next to FIG. 16, a flowchart is shown of an example method 1600 for an MTC association scheme. The method 1600 may be performed using, for example, the wireless communications system 100 of FIG. 1 and those portions illustrated in FIG. 2A and FIG. 2B; and/or the MTC UEs 115, 215, 715, and 915 of FIG. 1, FIG. 2A, FIG. 2B, FIG. 7A, FIG. 7B, and FIG. 9.

At block 1605, MTC information is received at a user equipment from a first base station during one or more sub-frames in a frame and from a second base station during one or more different sub-frames in the same frame. At block 1610, a first channel metric is determined for the first base station based at least in part on the MTC information received from the first base station. At block 1615, a second channel metric is determined for the second base station based at least in part on the MTC information received from the second base station. At block 1620, one of the first base station and the second base station is selected for association with the user equipment, where the selection is based at least in part on the first channel metric and the second channel metric.

Figure 17:
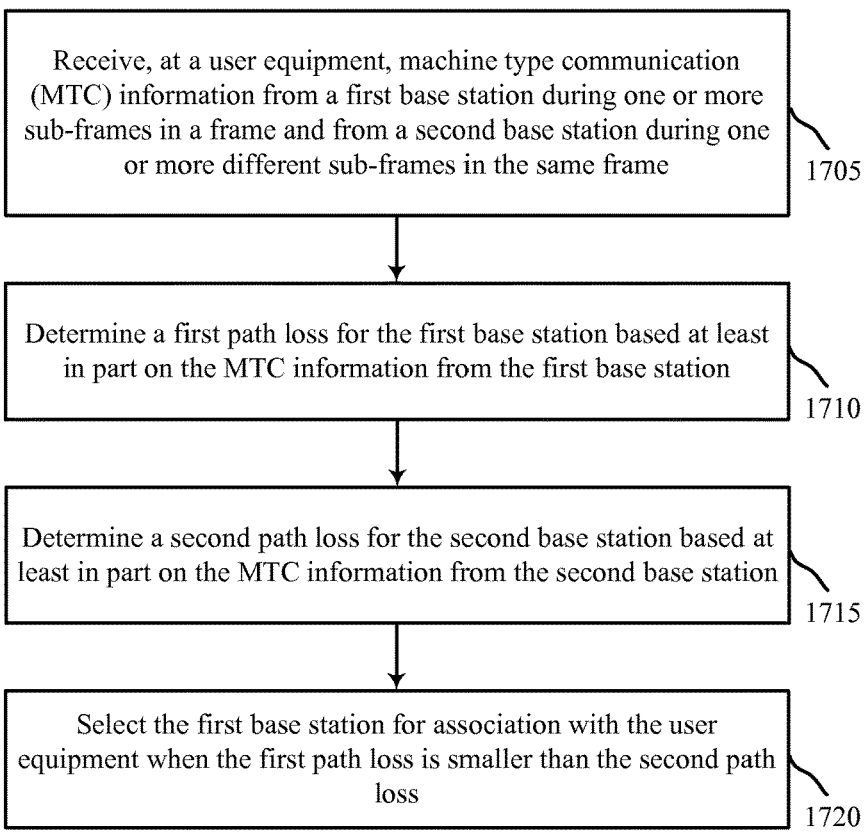
FIG. 17 is a flowchart of yet another example of a method for an MTC association scheme according to various embodiments.

Turning to FIG. 17, a flowchart is shown of an example method 1700 for an MTC association scheme. The method 1700, like the method 1600 above, may be performed using, for example, the wireless communications system 100 of FIG. 1 and those portions illustrated in FIG. 2A and FIG. 2B; and/or the MTC UEs 115, 215, 715, and 915 of FIG. 1, FIG. 2A, FIG. 2B, FIG. 7A, FIG. 7B, and FIG. 9.

At block 1705, MTC information is received at a user equipment from a first base station during one or more sub-frames in a frame and from a second base station during one or more different sub-frames in the same frame. At block 1710, a first path loss is determined for the first base station based at least in part on the MTC information received from the first base station. At block 1715, a second path loss is determined for the second base station based at least in part on the MTC information received from the second base station. At block 1720, the first base station is selected for association with the user equipment when the first path loss is smaller than the second path loss.

Figure 18:
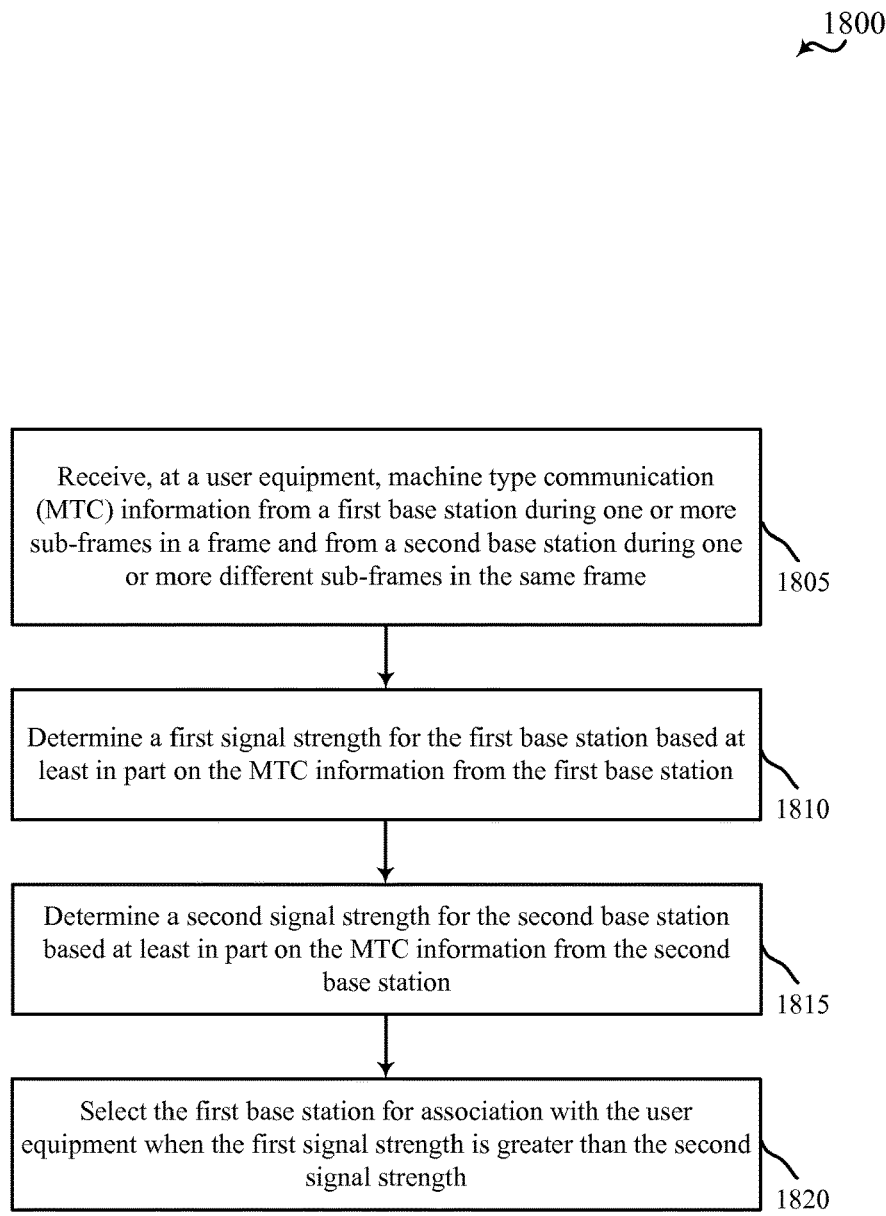
FIG. 18 is a flowchart of yet another example of a method for an MTC association scheme according to various embodiments.

Turning next to FIG. 18, a flowchart is shown of an example method 1800 for an MTC association scheme. The method 1800, like the methods 1600 and 1700 above, may be performed using, for example, the wireless communications system 100 of FIG. 1 and those portions illustrated in FIG. 2A and FIG. 2B; and/or the MTC UEs 115, 215, 715, and 915 of FIG. 1, FIG. 2A, FIG. 2B, FIG. 7A, FIG. 7B, and FIG. 9.

At block 1805, MTC information is received at a user equipment from a first base station during one or more sub-frames in a frame and from a second base station during one or more different sub-frames in the same frame. At block 1810, a first signal strength is determined for the first base station based at least in part on the MTC information received from the first base station. At block 1815, a second signal strength is determined for the second base station based at least in part on the MTC information received from the second base station. At block 1820, the first base station is selected for association with the user equipment when the first signal strength is greater than the second path loss.

Figure 19:
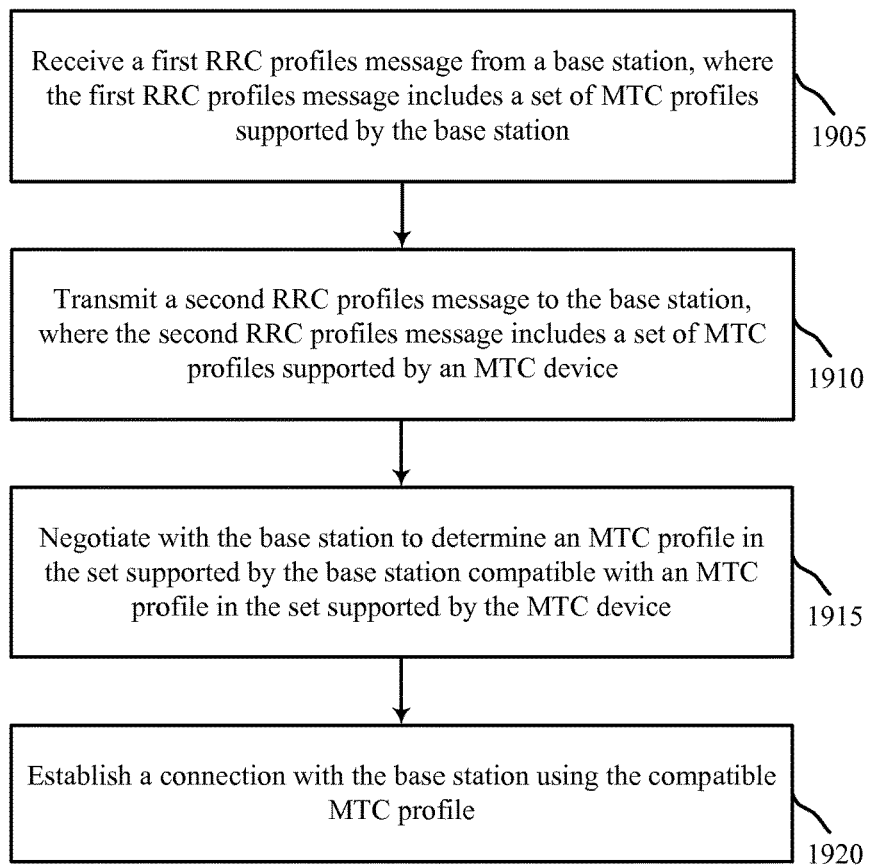
FIG. 19 is a flowchart of an example of a method for negotiating an MTC connection based on MTC profiles according to various embodiments.

Turning next to FIG. 19, a flowchart is shown of an example method 1900 for negotiating an MTC connection based on MTC profiles. The method 1900 may be performed using, for example, the wireless communications system 100 of FIG. 1 and those portions illustrated in FIG. 2A and FIG. 2B; the devices 800 and 820 of FIG. 8A and FIG. 8B; and/or the MTC UEs 115, 215, 715, and 915 of FIG. 1, FIG. 2A, FIG. 2B, FIG. 7A, FIG. 7B, and FIG. 9.

At block 1905, a first RRC profiles message may be received from a base station (e.g., base stations 105, 205, 220, 705, 1005, and 1110) or cell, where the first RRC profiles message includes a set of MTC profiles supported by the base station. The first RRC profiles message may be broadcast by the base station after an association or in connection with an association to the base station. At block 1910, a second RRC profiles message may be transmitted to the base station, where the second RRC profiles message includes a set of MTC profiles supported by an MTC device (e.g., MTC UE). At block 1915, a negotiation may take place to determine an MTC profile in the set supported by the base station that is compatible with an MTC profile in the set supported by the MTC device. At block 1920, a connection may be established with the base station using the compatible MTC profile. The established connection enables MTC communications with the base station.

In some embodiments of the method 1900, an RRC request message is transmitted to the base station to request the set of MTC profiles supported by the base station. The first RRC profiles message is received from the base station in response to the RRC request message. The transmission of the RRC request message may be part of an RRC connection setup message or of an RRC reconfiguration message, for example.

In some embodiments of the method 1900, the first RRC profiles message is an RRC message broadcast by the base station, and the set of MTC profiles supported by the base station are included in one or more SIBs in the RRC broadcast message.

In some embodiments of the method 1900, each MTC profile in the set supported by the base station indicates one or more of a periodicity for MTC communications, a delay budget for MTC communications, or a bit rate for MTC communications. Similarly, each MTC profile in the set supported by the MTC device indicates one or more of a periodicity for MTC communications, a delay budget for MTC communications, a bit rate for MTC communications, and at least one security parameter.

In some embodiments of the method 1900, an RRC rejection message is transmitted to the base station, where the RRC rejection message indicates that the MTC device rejects a connection with the base station when the negotiation results in incompatible MTC profiles between the MTC device and the base station.

In some embodiments of the method 1900, each of the MTC profiles in the set supported by the base station is identified from one or more bits received in the first RRC profiles message.

In some embodiments of the method 1900, the base station is a first base station in a heterogeneous network having multiple base stations that support MTC communications, and the method 1900 also includes transmitting to the first base station an RRC rejection message indicating that the MTC device rejects a connection with the first base station when the negotiation results in incompatible MTC profiles between the MTC device and the first base station, and identifying a second base station from the heterogeneous network with which the MTC device is to associate next. The first base station may correspond to a small cell in the heterogeneous network, and the second base station may correspond to a macro cell in the heterogeneous network, for example. In another example, the first base station may correspond to a macro cell in the heterogeneous network, and the second base station may correspond to a small cell in the heterogeneous network, for example.

Figure 20:
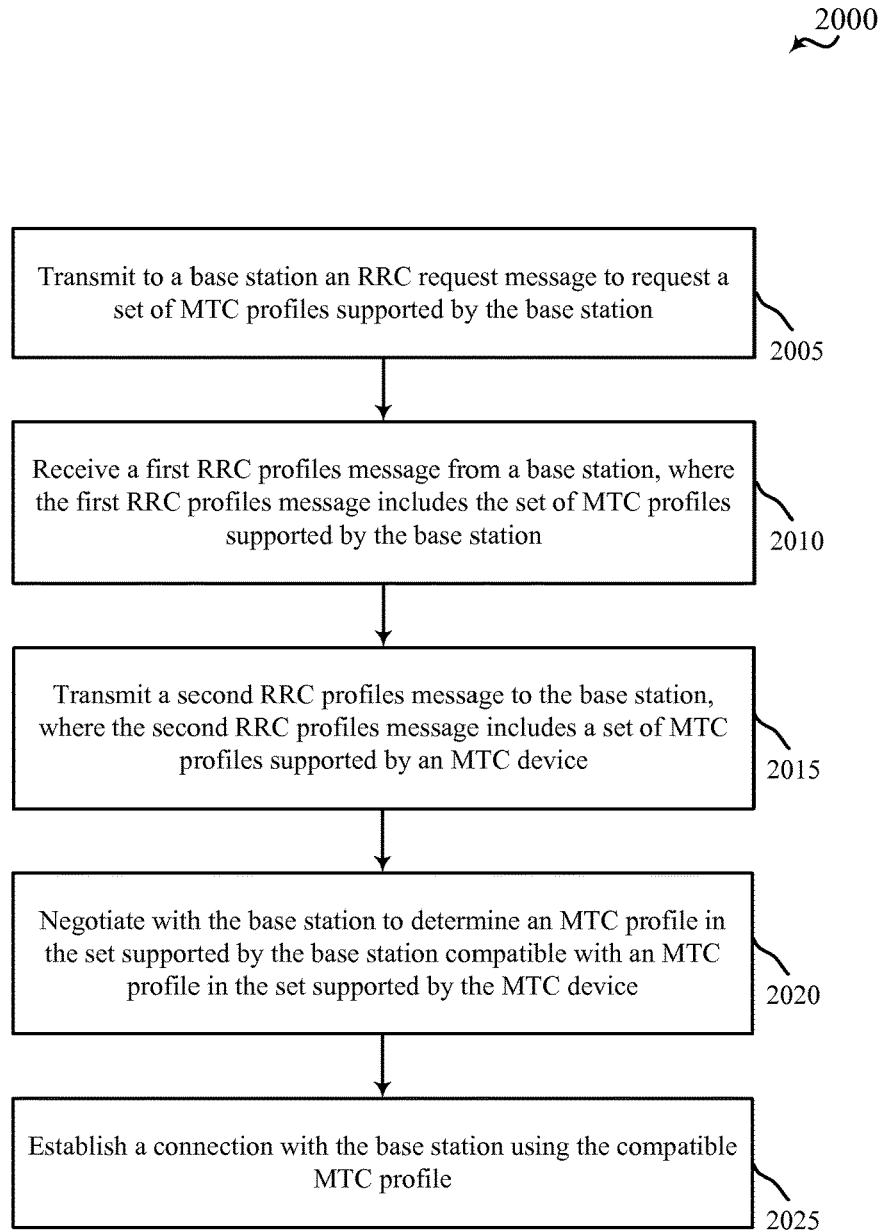
FIG. 20 is a flowchart of another example of a method for negotiating an MTC connection based on MTC profiles according to various embodiments.

Turning to FIG. 20, a flowchart is shown of an example method 2000 for negotiating an MTC connection based on MTC profiles. The method 2000, like the method 1900 above, may be performed using, for example, the wireless communications system 100 of FIG. 1 and those portions illustrated in FIG. 2A and FIG. 2B; the devices 800 and 820 of FIG. 8A and FIG. 8B; and/or the MTC UEs 115, 215, 715, and 915 of FIG. 1, FIG. 2A, FIG. 2B, FIG. 7A, FIG. 7B, and FIG. 9.

At block 2005, an RRC request message may be transmitted to a base station (e.g., base stations 105, 205, 220, 705, 1005, and 1110) or cell to request a set of MTC profiles supported by the base station. At block 2010, a first RRC profiles message may be received from the base station, where the first RRC profiles message includes a set of MTC profiles supported by the base station. The first RRC profiles message may be received in response to the RRC request message. At block 2015, a second RRC profiles message may be transmitted to the base station, where the second RRC profiles message includes a set of MTC profiles supported by an MTC device (e.g., MTC UE). At block 2020, a negotiation may take place to determine an MTC profile in the set supported by the base station that is compatible with an MTC profile in the set supported by the MTC device. At block 2025, a connection may be established with the base station using the compatible MTC profile. The established connection enables MTC communications with the base station.

Figure 21:
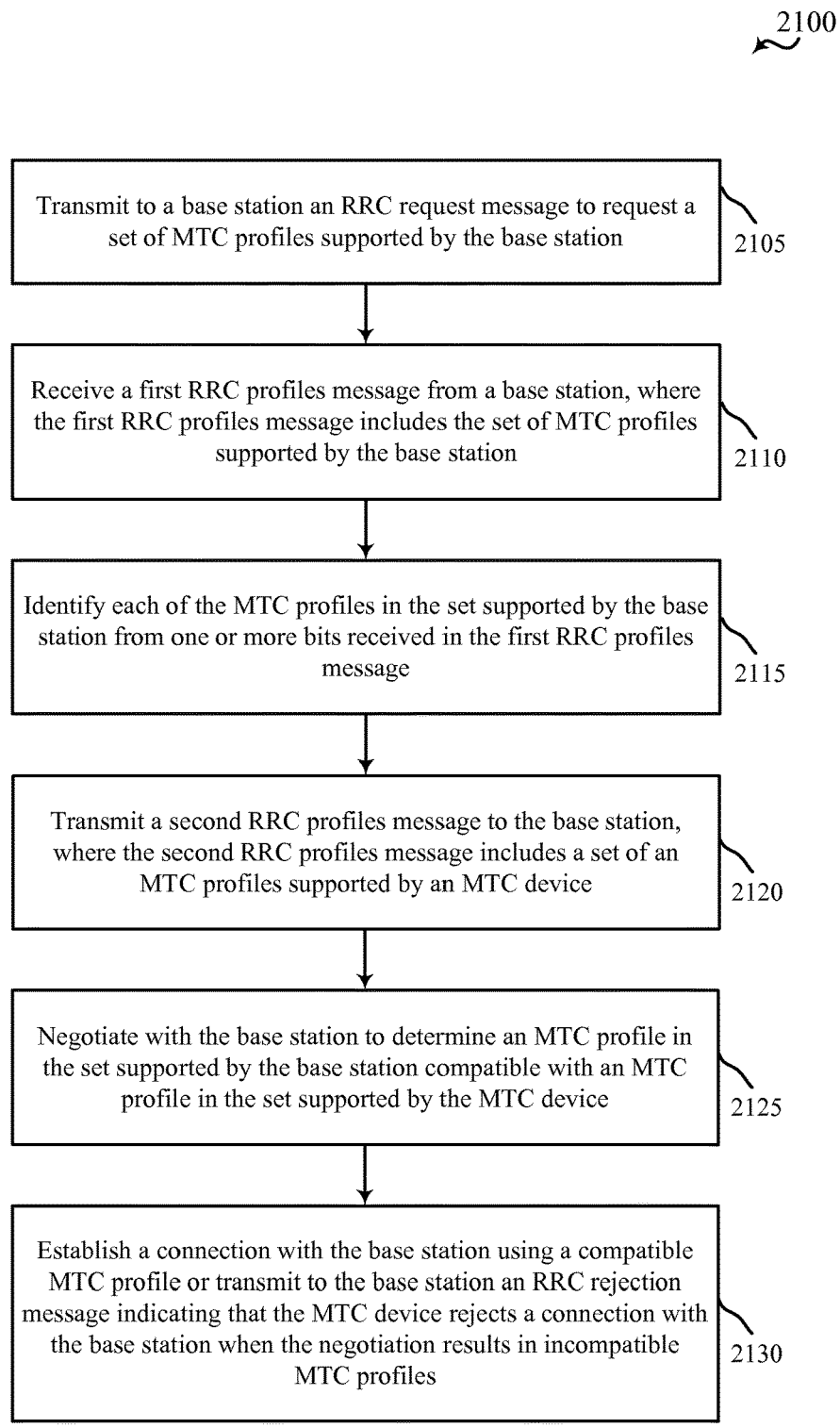
FIG. 21 is a flowchart of yet another example of a method for negotiating an MTC connection based on MTC profiles according to various embodiments.

Turning to FIG. 21, a flowchart is shown of an example method 2100 for negotiating an MTC connection based on MTC profiles. The method 2100, like the methods 1900 and 2000 above, may be performed using, for example, the wireless communications system 100 of FIG. 1 and those portions illustrated in FIG. 2A and FIG. 2B; the devices 800 and 820 of FIG. 8A and FIG. 8B; and/or the MTC UEs 115, 215, 715, and 915 of FIG. 1, FIG. 2A, FIG. 2B, FIG. 7A, FIG. 7B, and FIG. 9.

At block 2105, an RRC request message may be transmitted to a base station (e.g., base stations 105, 205, 220, 705, 1005, and 1110) or cell to request a set of MTC profiles supported by the base station. At block 2110, a first RRC profiles message may be received from the base station, where the first RRC profiles message includes a set of MTC profiles supported by the base station. The first RRC profiles message may be received in response to the RRC request message. At block 2115, each of the MTC profiles supported by the base station may be identified from one or more bits received in the first RRC profiles message. For example, the one or more bits may be used to represent one or more MTC profiles and a table or like structure may be used to identify the MTC profiles represented and their corresponding characteristics and/or parameters.

At block 2120, a second RRC profiles message may be transmitted to the base station, where the second RRC profiles message includes a set of MTC profiles supported by an MTC device (e.g., MTC UE). At block 2125, a negotiation may take place to determine an MTC profile in the set supported by the base station that is compatible with an MTC profile in the set supported by the MTC device. At block 2130, a connection may be established with the base station using the compatible MTC profile. The established connection enables MTC communications with the base station. When the negotiation results in incompatible MTC profiles, an RRC rejection message may be transmitted to the base station, where the RRC rejection message indicates that the MTC device rejects a connection with the base station.

Figure 22:
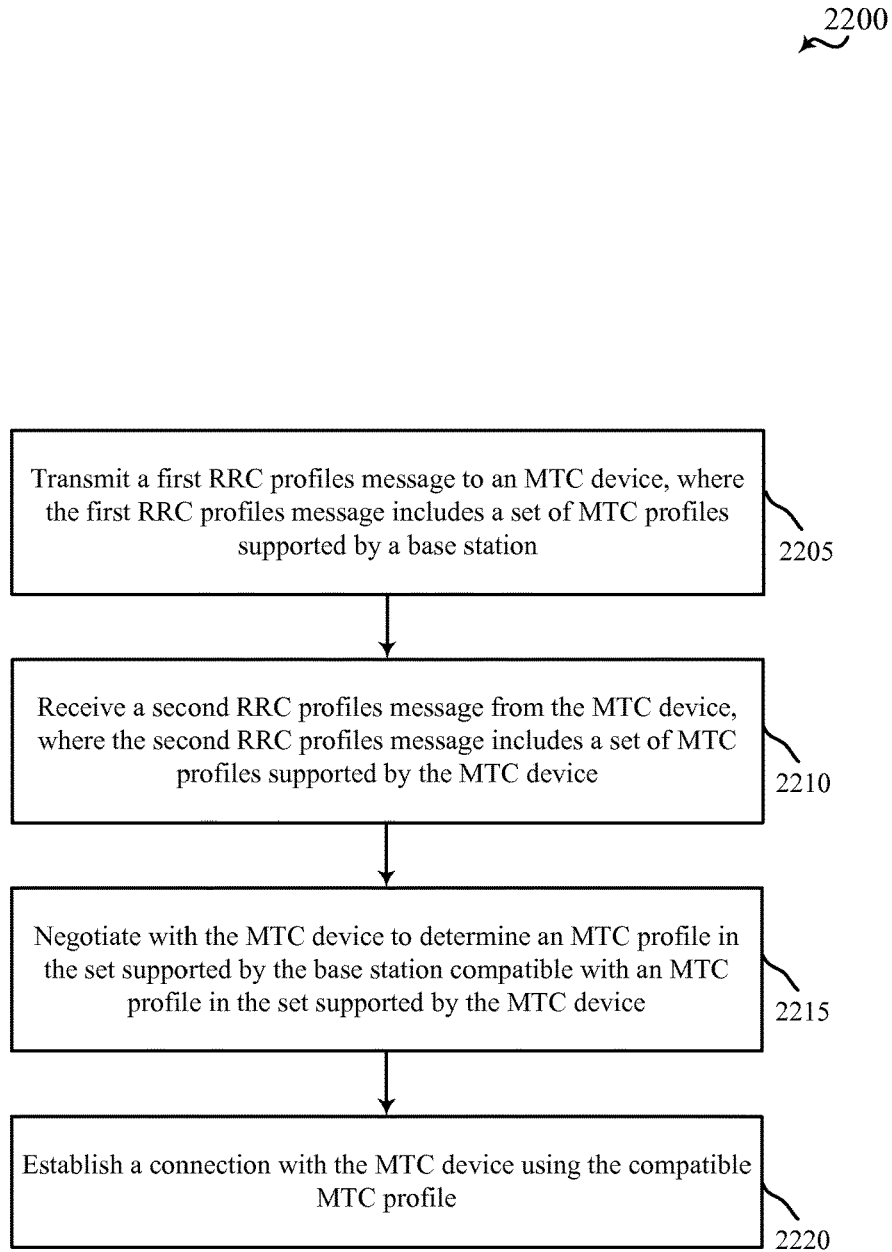
FIG. 22 is a flowchart of an example of a method for negotiating an MTC connection based on MTC profiles according to various embodiments.

Turning next to FIG. 22, a flowchart is shown of an example method 2200 for negotiating an MTC connection based on MTC profiles. The method 2200 may be performed using, for example, the wireless communications system 100 of FIG. 1 and those portions illustrated in FIG. 2A and FIG. 2B; the devices 800 and 820 of FIG. 8A and FIG. 8B; and/or the base stations 105, 205, 220, 705, 1005, and 1110 of FIG. 1, FIG. 2A, FIG. 2B, FIG. 7A, FIG. 7B, FIG. 10, and FIG. 11.

At block 2205, a first RRC profiles message may be transmitted to an MTC device (e.g., MTC UE 115, 215, 715, and 915), where the first RRC profiles message includes a set of MTC profiles supported by a base station. The first RRC profiles message may be broadcast to the MTC device after an association or in connection with an association to the MTC device. At block 2210, a second RRC profiles message may be received from the MTC device, where the second RRC profiles message includes a set of MTC profiles supported by the MTC device. At block 2215, a negotiation may take place to determine an MTC profile in the set supported by the base station that is compatible with an MTC profile in the set supported by the MTC device. At block 2220, a connection may be established with the MTC device using the compatible MTC profile. The established connection enables MTC communications with the MTC device.

In some embodiments of the method 2200, an RRC request message is received from the MTC device to request the set of MTC profiles supported by the base station. The first RRC profiles message is transmitted to the MTC device in response to the RRC request message. The RRC request message may be received as part of an RRC connection setup message or as part of an RRC reconfiguration message.

In some embodiments of the method 2200, the first RRC profiles message is an RRC message broadcast by the base station, the method 2200 also includes providing the set of MTC profiles supported by the base station in one or more SIBs in the RRC broadcast message.

In some embodiments of the method 2200, each MTC profile in the set supported by the base station indicates one or more of a periodicity for MTC communications, a delay budget for MTC communications, or a bit rate for MTC communications. Similarly, each MTC profile in the set supported by the MTC device indicates one or more of a periodicity for MTC communications, a delay budget for MTC communications, a bit rate for MTC communications, and at least one security parameter.

In some embodiments of the method 2200, an RRC rejection message is received from the MTC device to indicate that the MTC device rejects a connection with the base station when the negotiation results in incompatible MTC profiles between the MTC device and the base station.

In some embodiments of the method 2200, one or more bits in the first RRC profiles message may be assigned to represent the MTC profiles in the set supported by the base station.

Figure 23:
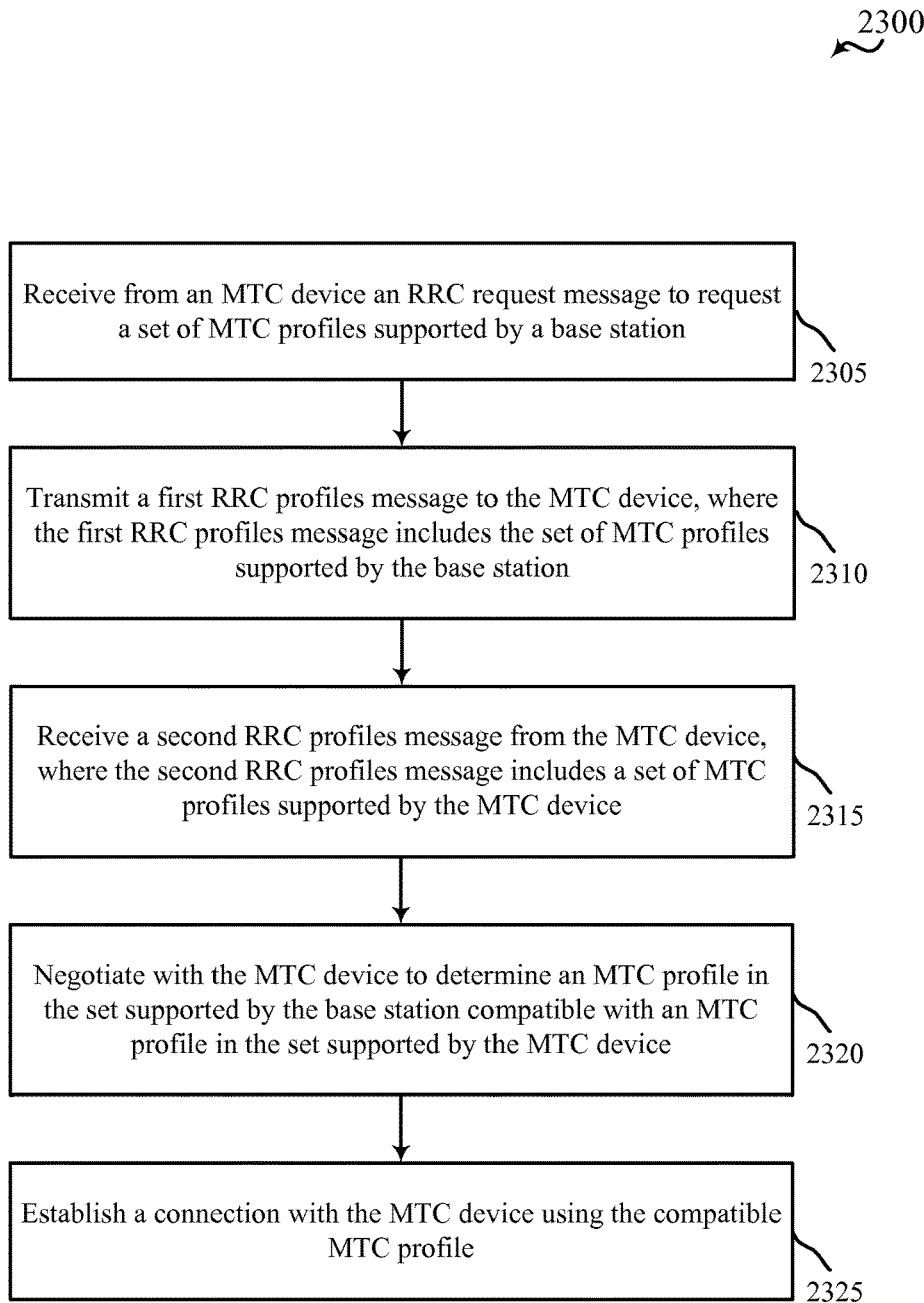
FIG. 23 is a flowchart of another example of a method for negotiating an MTC connection based on MTC profiles according to various embodiments.

Turning to FIG. 23, a flowchart is shown of an example method 2300 for negotiating an MTC connection based on MTC profiles. The method 2300, like the method 2200 above, may be performed using, for example, the wireless communications system 100 of FIG. 1 and those portions illustrated in FIG. 2A and FIG. 2B; the devices 800 and 820 of FIG. 8A and FIG. 8B; and/or the base stations 105, 205, 220, 705, 1005, and 1110 of FIG. 1, FIG. 2A, FIG. 2B, FIG. 7A, FIG. 7B, FIG. 10, and FIG. 11.

At block 2305, an RRC request message may be received from an MTC device (e.g., MTC UE 115, 215, 715, and 915) to request a set of MTC profiles supported by a base station. At block 2310, a first RRC profiles message may be transmitted to the MTC device, where the first RRC profiles message includes the set of MTC profiles supported by the base station. The first RRC profiles message may be transmitted in response to the RRC request message. At block 2315, a second RRC profiles message may be received from the MTC device, where the second RRC profiles message includes a set of MTC profiles supported by the MTC device. At block 2320, a negotiation may take place to determine an MTC profile in the set supported by the base station that is compatible with an MTC profile in the set supported by the MTC device. At block 2325, a connection may be established with the MTC device using the compatible MTC profile. The established connection enables MTC communications with the MTC device.

Figure 24:
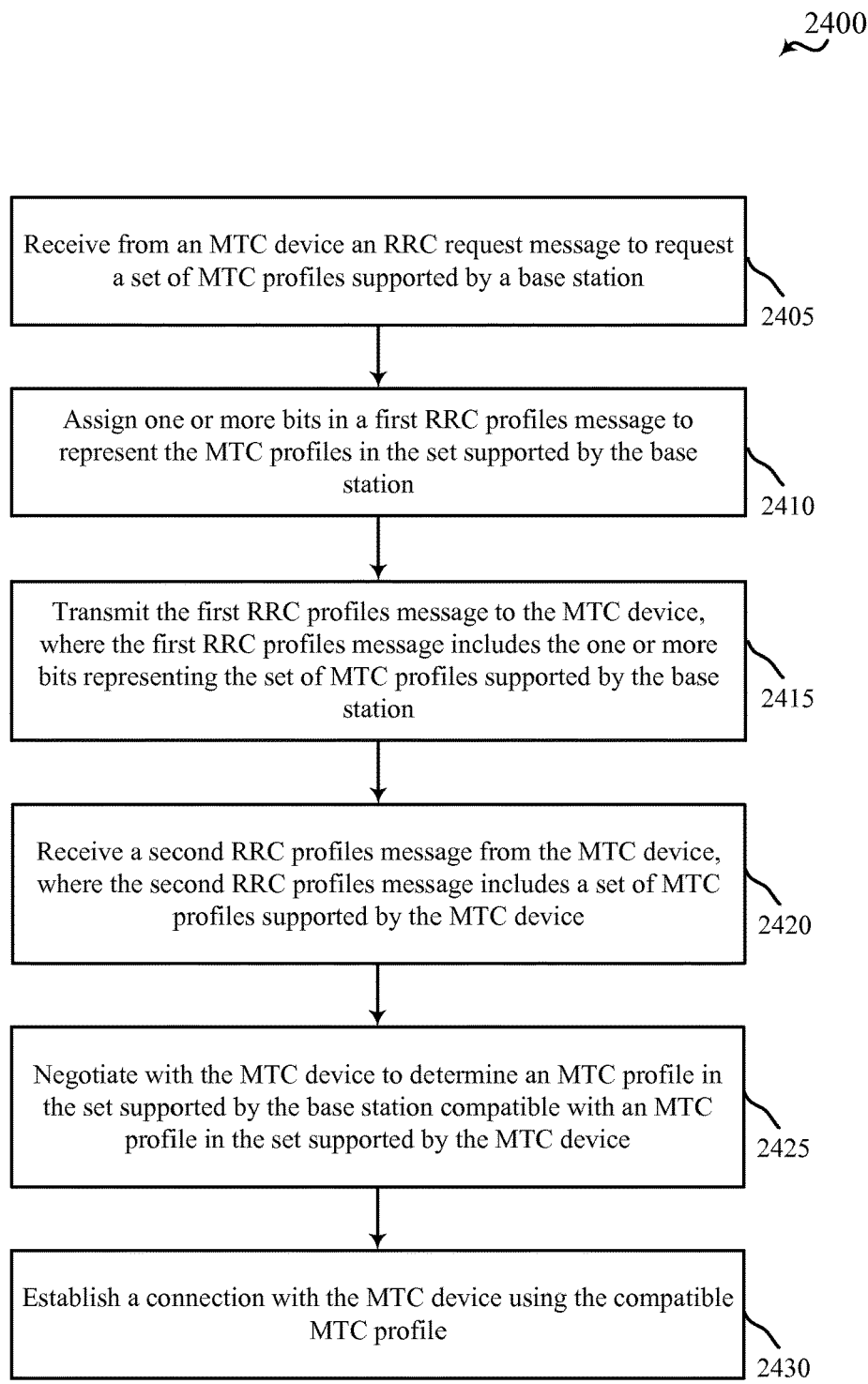
FIG. 24 is a flowchart of yet another example of a method for negotiating an MTC connection based on MTC profiles according to various embodiments.

Turning to FIG. 24, a flowchart is shown of an example method 2400 for negotiating an MTC connection based on MTC profiles. The method 2400, like the methods 2200 and 2300 above, may be performed using, for example, the wireless communications system 100 of FIG. 1 and those portions illustrated in FIG. 2A and FIG. 2B; the devices 800 and 820 of FIG. 8A and FIG. 8B; and/or the base stations 105, 205, 220, 705, 1005, and 1110 of FIG. 1, FIG. 2A, FIG. 2B, FIG. 7A, FIG. 7B, FIG. 10, and FIG. 11.

At block 2405, an RRC request message may be received from an MTC device (e.g., MTC UE 115, 215, 715, and 915) to request a set of MTC profiles supported by a base station. At block 2410, one or more bits in a first RRC profiles message may be assigned to represent the MTC profiles in the set supported by the base station. At block 2415, the first RRC profiles message may be transmitted to the MTC device, where the first RRC profiles message includes the one or more bits representing the set of MTC profiles supported by the base station. The first RRC profiles message may be transmitted in response to the RRC request message. At block 2420, a second RRC profiles message may be received from the MTC device, where the second RRC profiles message includes a set of MTC profiles supported by the MTC device. At block 2425, a negotiation may take place to determine an MTC profile in the set supported by the base station that is compatible with an MTC profile in the set supported by the MTC device. At block 2430, a connection may be established with the MTC device using the compatible MTC profile. The established connection enables MTC communications with the MTC device.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, instructions, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

Additional methods, apparatus, and computer program products for wireless communications are described. For example, a method includes receiving, at a user equipment, MTC information from a first base station during one or more sub-frames in a frame and from a second base station during one or more different sub-frames in the same frame. The method also includes determining a first channel metric for the first base station based at least in part on the MTC information received from the first base station and determining a second channel metric for the second base station based at least in part on the MTC information received from the second base station. The method further includes selecting, for association with the user equipment, one of the first base station and the second base station, where the selection is based at least in part on the first channel metric and the second channel metric. In some embodiments, the first base station may correspond to a small cell in a heterogeneous network and the second base station may correspond to a macro cell in the heterogeneous network. In some embodiments, the first channel metric may be a first path loss and the second channel metric may be a second path loss, and the method may include selecting the first base station for association with the user equipment when the first path loss is smaller than the second path loss. In some embodiments, the first channel metric may be a first signal strength and the second channel metric may be a second signal strength, and the method may include selecting the first base station for association with the user equipment when the first signal strength is greater than the second signal strength.

An apparatus for wireless communications includes means for receiving, at a user equipment, MTC information from a first base station during one or more sub-frames in a frame and from a second base station during one or more different sub-frames in the same frame. The apparatus also includes means for determining a first channel metric for the first base station based at least in part on the MTC information received from the first base station. The apparatus also includes means for determining a second channel metric for the second base station based at least in part on the MTC information received from the second base station. The apparatus may further include means for selecting, for association with the user equipment, one of the first base station and the second base station, where the selection is based at least in part on the first channel metric and the second channel metric. In some embodiments, the first base station may correspond to a small cell in a heterogeneous network and the second base station may correspond to a macro cell in the heterogeneous network. In some embodiments, the first channel metric may be a first path loss and the second channel metric may be a second path loss, and the apparatus further includes means for selecting the first base station for association with the user equipment when the first path loss is smaller than the second path loss. In some embodiments, the first channel metric may be a first signal strength and the second channel metric may be a second signal strength, and the apparatus further includes means for selecting the first base station for association with the user equipment when the first signal strength is greater than the second signal strength.

An apparatus for wireless communications includes a receiver module configured to receive, at a user equipment, MTC information from a first base station during one or more sub-frames in a frame and from a second base station during one or more different sub-frames in the same frame. The apparatus also includes an MTC module configured to determine a first channel metric for the first base station based at least in part on the MTC information received from the first base station, to determine a second channel metric for the second base station based at least in part on the MTC information received from the second base station, and to select, for association with the user equipment, one of the first base station and the second base station, where the selection is based at least in part on the first channel metric and the second channel metric. In some embodiments, the first base station may correspond to a small cell in a heterogeneous network and the second base station may correspond to a macro cell in the heterogeneous network. In some embodiments, the first channel metric may be a first path loss and the second channel metric may be a second path loss, and the MTC module may be further configured to select the first base station for association with the user equipment when the first path loss is smaller than the second path loss. In some embodiments, the first channel metric may be a first signal strength and the second channel metric may be a second signal strength, and the MTC module may be further configured to select the first base station for association with the user equipment when the first signal strength is greater than the second signal strength.

A computer program product includes a non-transitory computer-readable medium having code for causing at least one computer to receive, at a user equipment, MTC information from a first base station during one or more sub-frames in a frame and from a second base station during one or more different sub-frames in the same frame. The non-transitory computer-readable medium also has code for causing the at least one computer to determine a first channel metric for the first base station based at least in part on the MTC information received from the first base station. The non-transitory computer-readable medium also has code for causing the at least one computer to determine a second channel metric for the second base station based at least in part on the MTC information received from the second base station. The non-transitory computer-readable medium further has code for causing the at least one computer to select, for association with the user equipment, one of the first base station and the second base station, where the selection is based at least in part on the first channel metric and the second channel metric. In some embodiments, the first base station may correspond to a small cell in a heterogeneous network and the second base station may correspond to a macro cell in the heterogeneous network. In some embodiments, the first channel metric may be a first path loss and the second channel metric may be a second path loss, and the non-transitory computer-readable medium may have code for causing the at least one computer to select the first base station for association with the user equipment when the first path loss is smaller than the second path loss. In some embodiments, the first channel metric may be a first signal strength and the second channel metric may be a second signal strength, and the non-transitory computer-readable medium may have code for causing the at least one computer to select the first base station for association with the user equipment when the first signal strength is greater than the second signal strength.

Additional methods and apparatuses are described for wireless communications in which an MTC device may negotiate a connection with an associated cell or base station for MTC communications. In a long-term evolution (LTE) heterogeneous network, the MTC device may associate with a macro cell or a small cell using a narrowband MTC channel supported by the cells. After associating with one of the cells, the MTC device may receive radio resource control (RRC) messages from the associated cell (e.g., base station) that include information about the MTC profiles supported by the cell. In some cases, the RRC messages from the associated cell are in response to a request made by the MTC device. The MTC device may transmit RRC messages to the cell with information about the MTC profiles supported by the MTC device. The MTC device and the cell may negotiate to determine a compatible MTC profile with which to establish a connection that will enable MTC communications between them. When the results from the negotiation indicate that the MTC profiles are incompatible, the MTC device may send an RRC rejection message to the cell and may associate with another cell in the LTE heterogeneous network to establish a connection for MTC communications.

A method for wireless communications includes receiving a first RRC profiles message from a base station, where the first RRC profiles message includes a set of MTC profiles supported by the base station. The method includes transmitting a second RRC profiles message to the base station, where the second RRC profiles message includes a set of MTC profiles supported by an MTC device. The method also includes negotiating with the base station to determine an MTC profile in the set supported by the base station compatible with an MTC profile in the set supported by the MTC device. The method further includes establishing a connection with the base station utilizing the compatible MTC profile.

In some embodiments of the method, the method includes transmitting to the base station an RRC request message to request the set of MTC profiles supported by the base station, and the receiving includes receiving the first RRC profiles message from the base station in response to the RRC request message. The transmitting may include transmitting to the base station the RRC request message as part of an RRC connection setup message or as part of an RRC reconfiguration message. The first RRC profiles message may be an RRC message broadcast by the base station, and the set of MTC profiles supported by the base station may be included in one or more system information blocks (SIBs) in the RRC broadcast message.

In some embodiments of the method, each MTC profile in the set supported by the base station indicates one or more of a periodicity for MTC communications, a delay budget for MTC communications, or a bit rate for MTC communications. Similarly, each MTC profile in the set supported by the MTC device indicates one or more of a periodicity for MTC communications, a delay budget for MTC communications, a bit rate for MTC communications, and at least one security parameter.

In some embodiments of the method, the method includes transmitting to the base station an RRC rejection message indicating that the MTC device rejects a connection with the base station when the negotiation results in incompatible MTC profiles between the MTC device and the base station. In some embodiments of the method, the method includes identifying each of the MTC profiles in the set supported by the base station from one or more bits received in the first RRC profiles message.

In some embodiments of the method, the base station is a first base station in a heterogeneous network having multiple base stations that support MTC communications, and the method includes transmitting to the first base station an RRC rejection message indicating that the MTC device rejects a connection with the first base station when the negotiation results in incompatible MTC profiles between the MTC device and the first base station, and identifying a second base station from the heterogeneous network with which the MTC device is to associate next. In one example, first base station may correspond to a small cell in the heterogeneous network, and the second base station corresponds to a macro cell in the heterogeneous network. In another example, first base station may correspond to a macro cell in the heterogeneous network, and the second base station corresponds to a small cell in the heterogeneous network.

A method for wireless communications includes transmitting a first RRC profiles message to an MTC device, where the first RRC profiles message includes a set of MTC profiles supported by a base station. The method includes receiving a second RRC profiles message from the MTC device, where the second RRC profiles message includes a set of MTC profiles supported by the MTC device. The method also includes negotiating with the MTC device to determine an MTC profile in the set supported by the base station compatible with an MTC profile in the set supported by the MTC device. The method further includes establishing a connection with the MTC device utilizing the compatible MTC profile.

In some embodiments of the method, the method includes receiving from the MTC device an RRC request message to request the set of MTC profiles supported by the base station, and the transmitting includes transmitting the first RRC profiles message to the MTC device in response to the RRC request message. In some embodiments of the method, the receiving includes receiving from the MTC device the RRC request message as part of an RRC connection setup message or as part of an RRC reconfiguration message. The first RRC profiles message may be an RRC message broadcast by the base station, and the method includes providing the set of MTC profiles supported by the base station in one or more SIBs in the RRC broadcast message.

In some embodiments of the method, each MTC profile in the set supported by the base station indicates one or more of a periodicity for MTC communications, a delay budget for MTC communications, or a bit rate for MTC communications. Similarly, each MTC profile in the set supported by the MTC device indicates one or more of a periodicity for MTC communications, a delay budget for MTC communications, a bit rate for MTC communications, and at least one security parameter.

In some embodiments of the method, the method includes receiving from the MTC device an RRC rejection message indicating that the MTC device rejects a connection with the base station when the negotiation results in incompatible MTC profiles between the MTC device and the base station. In some embodiments of the method, the method includes assigning one or more bits in the first RRC profiles message to represent the MTC profiles in the set supported by the base station.

An apparatus for wireless communications includes means for receiving a first RRC profiles message from a base station, where the first RRC profiles message includes a set of MTC profiles supported by the base station. The apparatus includes means for transmitting a second RRC profiles message to the base station, where the second RRC profiles message includes a set of MTC profiles supported by an MTC device. The apparatus also includes means for negotiating with the base station to determine an MTC profile in the set supported by the base station compatible with an MTC profile in the set supported by the MTC device. The apparatus further includes means for establishing a connection with the base station utilizing the compatible MTC profile.

In some embodiments of the apparatus, the means for transmitting includes means for transmitting to the base station an RRC request message to request the set of MTC profiles supported by the base station, and the means for receiving includes means for receiving the first RRC profiles message from the base station in response to the RRC request message. In some embodiments of the apparatus, the means for transmitting includes means for transmitting to the base station the RRC request message as part of an RRC connection setup message or as part of an RRC reconfiguration message. The first RRC profiles message may be an RRC message broadcast by the base station, and the set of MTC profiles supported by the base station may be included in one or more SIBs in the RRC broadcast message.

In some embodiments of the apparatus, each MTC profile in the set supported by the base station indicates one or more of a periodicity for MTC communications, a delay budget for MTC communications, or a bit rate for MTC communications. Similarly, each MTC profile in the set supported by the MTC device indicates one or more of a periodicity for MTC communications, a delay budget for MTC communications, a bit rate for MTC communications, and at least one security parameter.

In some embodiments of the apparatus, the means for transmitting includes means for transmitting to the base station an RRC rejection message indicating that the MTC device rejects a connection with the base station when the negotiation results in incompatible MTC profiles between the MTC device and the base station. In some embodiments of the apparatus, the apparatus includes means for identifying each of the MTC profiles in the set supported by the base station from one or more bits received in the first RRC profiles message.

In some embodiments of the apparatus, the base station is a first base station in a heterogeneous network having multiple base stations that support MTC communications, the means for transmitting comprises means for transmitting to the first base station an RRC rejection message indicating that the MTC device rejects a connection with the first base station when the negotiation results in incompatible MTC profiles between the MTC device and the first base station, and the apparatus further includes means for identifying a second base station from the heterogeneous network with which the MTC device is to associate next. In one example, first base station may correspond to a small cell in the heterogeneous network, and the second base station corresponds to a macro cell in the heterogeneous network. In another example, first base station may correspond to a macro cell in the heterogeneous network, and the second base station corresponds to a small cell in the heterogeneous network.

An apparatus for wireless communications includes means for transmitting a first RRC profiles message to an MTC device, where the first RRC profiles message comprising a set of MTC profiles supported by a base station. The apparatus includes means for receiving a second RRC profiles message from the MTC device, where the second RRC profiles message comprising a set of MTC profiles supported by the MTC device. The apparatus also includes means for negotiating with the MTC device to determine an MTC profile in the set supported by the base station compatible with an MTC profile in the set supported by the MTC device. The apparatus further includes means for establishing a connection with the MTC device utilizing the compatible MTC profile.

In some embodiments of the apparatus, the means for receiving includes means for receiving from the MTC device an RRC request message to request the set of MTC profiles supported by the base station, and the means for transmitting includes means for transmitting the first RRC profiles message to the MTC device in response to the RRC request message. The means for receiving may include means for receiving from the MTC device the RRC request message as part of an RRC connection setup message or as part of an RRC reconfiguration message. The first RRC profiles message may be an RRC message broadcast by the base station, and the apparatus includes means for providing the set of MTC profiles supported by the base station in one or more SIBs in the RRC broadcast message.

In some embodiments of the apparatus, each MTC profile in the set supported by the base station indicates one or more of a periodicity for MTC communications, a delay budget for MTC communications, or a bit rate for MTC communications. Similarly, each MTC profile in the set supported by the MTC device indicates one or more of a periodicity for MTC communications, a delay budget for MTC communications, a bit rate for MTC communications, and at least one security parameter.

In some embodiments of the apparatus, the means for receiving includes means for receiving from the MTC device an RRC rejection message indicating that the MTC device rejects a connection with the base station when the negotiation results in incompatible MTC profiles between the MTC device and the base station. In some embodiments of the apparatus, the apparatus includes means for assigning one or more bits in the first RRC profiles message to represent the MTC profiles in the set supported by the base station.

An apparatus for wireless communications includes a receiver configured to receive a first RRC profiles message from a base station, where the first RRC profiles message includes a set of MTC profiles supported by the base station. The apparatus includes a transmitter module configured to transmit a second RRC profiles message to the base station, where the second RRC profiles message includes a set of MTC profiles supported by an MTC device. The apparatus also includes a negotiation module configured to negotiate with the base station to determine an MTC profile in the set supported by the base station compatible with an MTC profile in the set supported by the MTC device. The apparatus further includes a connection module configured to establish a connection with the base station utilizing the compatible MTC profile.

In some embodiments of the apparatus, the transmitter module is configured to transmit to the base station an RRC request message to request the set of MTC profiles supported by the base station, and the receiver module is configured to receive the first RRC profiles message from the base station in response to the RRC request message. The transmitter module may be configured to transmit to the base station the RRC request message as part of an RRC connection setup message or as part of an RRC reconfiguration message. The first RRC profiles message may be an RRC message broadcast by the base station, and the set of MTC profiles supported by the base station may be included in one or more SIBs in the RRC broadcast message.

In some embodiments of the apparatus, each MTC profile in the set supported by the base station indicates one or more of a periodicity for MTC communications, a delay budget for MTC communications, or a bit rate for MTC communications. Similarly, each MTC profile in the set supported by the MTC device indicates one or more of a periodicity for MTC communications, a delay budget for MTC communications, a bit rate for MTC communications, and at least one security parameter.

In some embodiments of the apparatus, the transmitter module is configured to transmit to the base station an RRC rejection message indicating that the MTC device rejects a connection with the base station when the negotiation results in incompatible MTC profiles between the MTC device and the base station. In some embodiments of the apparatus, the apparatus includes an identification module configured to identify each of the MTC profiles in the set supported by the base station from one or more bits received in the first RRC profiles message.

In some embodiments of the apparatus, the base station is a first base station in a heterogeneous network having multiple base stations that support MTC communications, the transmitter module is configured to transmit to the first base station an RRC rejection message indicating that the MTC device rejects a connection with the first base station when the negotiation results in incompatible MTC profiles between the MTC device and the first base station, and the apparatus further includes an identification module configured to identify a second base station from the heterogeneous network with which the MTC device is to associate next. In one example, first base station may correspond to a small cell in the heterogeneous network, and the second base station corresponds to a macro cell in the heterogeneous network. In another example, first base station may correspond to a macro cell in the heterogeneous network, and the second base station corresponds to a small cell in the heterogeneous network.

An apparatus for wireless communications includes a transmitter module configured to transmit a first RRC profiles message to an MTC device, where the first RRC profiles message includes a set of MTC profiles supported by a base station. The apparatus includes a receiver module configured to receive a second RRC profiles message from the MTC device, where the second RRC profiles message includes a set of MTC profiles supported by the MTC device. The apparatus also includes a negotiation module configured to negotiate with the MTC device to determine an MTC profile in the set supported by the base station compatible with an MTC profile in the set supported by the MTC device. The apparatus further includes a connection module configured to establish a connection with the MTC device utilizing the compatible MTC profile.

In some embodiments of the apparatus, the receiver module is configured to receive from the MTC device an RRC request message to request the set of MTC profiles supported by the base station, and the transmitter module is configured to transmit the first RRC profiles message to the MTC device in response to the RRC request message. In some embodiments of the apparatus, the receiver module is configured to receive from the MTC device the RRC request message as part of an RRC connection setup message or as part of an RRC reconfiguration message. The first RRC profiles message may be an RRC message broadcast by the base station, and the transmitter module is configured to provide the set of MTC profiles supported by the base station in one or more SIBs in the RRC broadcast message.

In some embodiments of the apparatus, each MTC profile in the set supported by the base station indicates one or more of a periodicity for MTC communications, a delay budget for MTC communications, or a bit rate for MTC communications. Similarly, each MTC profile in the set supported by the MTC device indicates one or more of a periodicity for MTC communications, a delay budget for MTC communications, a bit rate for MTC communications, and at least one security parameter.

In some embodiments of the apparatus, the receiver module is configured to receive from the MTC device an RRC rejection message indicating that the MTC device rejects a connection with the base station when the negotiation results in incompatible MTC profiles between the MTC device and the base station. In some embodiments of the apparatus, the apparatus includes an assignment module configured to assign one or more bits in the first RRC profiles message to represent the MTC profiles in the set supported by the base station.

A computer program product includes a non-transitory computer-readable medium having code for causing at least one computer to receive a first RRC profiles message from a base station, where the first RRC profiles message includes a set of machine type communication (MTC) profiles supported by the base station. The non-transitory computer-readable medium includes code for causing the at least one computer to transmit a second RRC profiles message to the base station, where the second RRC profiles message includes a set of MTC profiles supported by an MTC device. The non-transitory computer-readable medium also includes code for causing the at least one computer to negotiate with the base station to determine an MTC profile in the set supported by the base station compatible with an MTC profile in the set supported by the MTC device. The non-transitory computer-readable further includes code for causing the at least one computer to establish a connection with the base station utilizing the compatible MTC profile.

In some embodiments of the computer program product, the non-transitory computer-readable medium includes code for causing the at least one computer to transmit to the base station an RRC request message to request the set of MTC profiles supported by the base station, and code for causing the at least one computer to receive the first RRC profiles message from the base station in response to the RRC request message. In some embodiments of the computer program product, the non-transitory computer-readable medium includes code for causing the at least one computer to transmit to the base station the RRC request message as part of an RRC connection setup message or as part of an RRC reconfiguration message. The first RRC profiles message may be an RRC message broadcast by the base station, and the set of MTC profiles supported by the base station are included in one or more SIBs in the RRC broadcast message.

In some embodiments of the computer program product, each MTC profile in the set supported by the base station indicates one or more of a periodicity for MTC communications, a delay budget for MTC communications, or a bit rate for MTC communications. Similarly, each MTC profile in the set supported by the MTC device indicates one or more of a periodicity for MTC communications, a delay budget for MTC communications, a bit rate for MTC communications, and at least one security parameter.

In some embodiments of the computer program product, the non-transitory computer-readable medium includes code for causing the at least one computer to transmit to the base station an RRC rejection message indicating that the MTC device rejects a connection with the base station when the negotiation results in incompatible MTC profiles between the MTC device and the base station. In some embodiments of the computer program product, the non-transitory computer-readable medium includes code for causing the at least one computer to identify each of the MTC profiles in the set supported by the base station from one or more bits received in the first RRC profiles message.

In some embodiments of the computer program product, the base station is a first base station in a heterogeneous network having multiple base stations that support MTC communications, and the non-transitory computer-readable medium includes code for causing the at least one computer to transmit to the first base station an RRC rejection message indicating that the MTC device rejects a connection with the first base station when the negotiation results in incompatible MTC profiles between the MTC device and the first base station, and code for causing the at least one computer to identify a second base station from the heterogeneous network with which the MTC device is to associate next. In one example, first base station may correspond to a small cell in the heterogeneous network, and the second base station corresponds to a macro cell in the heterogeneous network. In another example, first base station may correspond to a macro cell in the heterogeneous network, and the second base station corresponds to a small cell in the heterogeneous network.

A computer program product includes a non-transitory computer-readable medium having code for causing at least one computer to transmit a first RRC profiles message to an MTC device, where the first RRC profiles message includes a set of MTC profiles supported by a base station. The non-transitory computer-readable medium includes code for causing the at least one computer to receive a second RRC profiles message from the MTC device, where the second RRC profiles message comprising a set of MTC profiles supported by the MTC device. The non-transitory computer-readable medium also includes code for causing the at least one computer to determine an MTC profile in the set supported by the base station compatible with an MTC profile in the set supported by the MTC device. The non-transitory computer-readable medium further includes code for causing the at least one computer to establish a connection with the MTC device utilizing the compatible MTC profile.

In some embodiments of the computer program product, the non-transitory computer-readable medium includes code for causing the at least one computer to receive from the MTC device an RRC request message to request the set of MTC profiles supported by the base station, and code for causing the at least one computer to transmit the first RRC profiles message to the MTC device in response to the RRC request message. In some embodiments of the computer program product, the non-transitory computer-readable medium includes code for causing the at least one computer to receive from the MTC device the RRC request message as part of an RRC connection setup message or as part of an RRC reconfiguration message. The first RRC profiles message may be an RRC message broadcast by the base station, and the non-transitory computer-readable medium includes code for causing the at least one computer provide the set of MTC profiles supported by the base station in one or more system information blocks (SIBs) in the RRC broadcast message.

In some embodiments of the computer program product, each MTC profile in the set supported by the base station indicates one or more of a periodicity for MTC communications, a delay budget for MTC communications, or a bit rate for MTC communications. Similarly, each MTC profile in the set supported by the MTC device indicates one or more of a periodicity for MTC communications, a delay budget for MTC communications, a bit rate for MTC communications, and at least one security parameter.

In some embodiments of the computer program product, the non-transitory computer-readable medium includes code for causing the at least one computer to receive from the MTC device an RRC rejection message indicating that the MTC device rejects a connection with the base station when the negotiation results in incompatible MTC profiles between the MTC device and the base station. In some embodiments of the computer program product, the non-transitory computer-readable medium includes code for causing the at least one computer to assign one or more bits in the first RRC profiles message to represent the MTC profiles in the set supported by the base station.

The foregoing has outlined the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

A method for wireless communications includes assigning, in a base station, one or more bits to indicate one or more properties of a channel supported by the base station for MTC and transmitting signals comprising the one or more bits through a broadcast channel. In some embodiments, the channel for MTC may have a corresponding set of resource blocks, and the one or more properties may identify a frequency offset of the set of resource blocks. In some embodiments, the channel for MTC may have a corresponding set of resource blocks, and the one or more properties may identify a position of the set of resource blocks in different sub-frames. In some embodiments, the channel for MTC may have a corresponding set of resource blocks, the base station may support one or more additional channels for MTC, where each of the one or more additional channel for MTC may have a corresponding set of resource blocks different from those of any other channel supported by the base station, and the one or more properties may identify a position of each set of resource blocks in a same sub-frame. In some embodiments, the one or more properties may identify one or more time periods during which the base station supports the channel for MTC.

A method for wireless communications includes receiving, at a first base station, coordinating information from an exchange between the first base station and a second base station such that the first base station communicates MTC information during one or more sub-frames in a frame while the second base station communicates MTC information during one or more different sub-frames in the same frame. The method also includes communicating the MTC information over a channel supported by the first base station for MTC during the one or more sub-frames. In some embodiments, the first base station may correspond to a small cell in a heterogeneous network and the second base station may correspond to a macro cell in the heterogeneous network.

In some embodiments, the method may include assigning a first set of resource blocks for communicating the MTC information during one of the one or more sub-frames, and assigning a second set of resource blocks, different from the first set of resource blocks, for communicating the MTC information during another of the one of more sub-frames. In some embodiments, the method may include adjusting a period for communicating the MTC information by the first base station based at least in part on a load of the first base station. In some embodiments, the second base station may be disabled such that no information is communicated in a set of resource blocks assigned for MTC during the one or more different sub-frames, and the method may include enabling the first base station to communicate MTC information during the set of resource blocks in the one or more different sub-frames. In some embodiments, based at least in part on the coordinating information, the first base station and the second base station may communicate MTC information at substantially the same power in corresponding sets of resource blocks assigned for MTC.

An apparatus for wireless communications includes means for assigning, at a base station, one or more bits to indicate one or more properties of a channel supported by the base station for MTC and means for transmitting signals comprising the one or more bits through a broadcast channel. In some embodiments, the channel for MTC may have a corresponding set of resource blocks, and the one or more properties may identify a frequency offset of the set of resource blocks. In some embodiments, the channel for MTC may have a corresponding set of resource blocks, and the one or more properties may identify a position of the set of resource blocks in different sub-frames. In some embodiments, the channel for MTC may have a corresponding set of resource blocks, the base station may support one or more additional channels for MTC, where each of the one or more additional channels for MTC may have a corresponding set of resource blocks different from those of any other channel supported by the base station, and the one or more properties may identify a position of each set of resource blocks in a same sub-frame. In some embodiments, the one or more properties may identify one or more time periods during which the base station supports the channel for MTC.

An apparatus for wireless communications includes means for receiving, at a first base station, coordinating information from an exchange between the first base station and a second base station such that the first base station communicates MTC information during one or more sub-frames in a frame while the second base station communicates MTC information during one or more different sub-frames in the same frame. The apparatus also includes means for communicating the MTC information over a channel supported by the first base station for MTC during the one or more sub-frames. In some embodiments, the first base station may correspond to a small cell in a heterogeneous network and the second base station may correspond to a macro cell in the heterogeneous network.

In some embodiments, the apparatus may also include means for assigning a first set of resource blocks for communicating the MTC information during one of the one or more sub-frames, and means for assigning a second set of resource blocks, different from the first set of resource blocks, for communicating the MTC information during another of the one of more sub-frames. The apparatus may also include means for adjusting a period for communicating the MTC information by the first base station based at least in part on a load of the first base station. In some embodiments, the second base station may be disabled such that no information is communicated during a set of resource blocks assigned for MTC the one or more different sub-frames, and the apparatus may further include means for enabling the first base station to communicate MTC information during the set of resource blocks in the one or more different sub-frames. In some embodiments, based at least in part on the coordinating information, the first base station and the second base station may communicate MTC information at substantially the same power in corresponding sets of resource blocks assigned for MTC.

An apparatus for wireless communications includes an MTC module configured to assign, at a base station, one or more bits to indicate one or more properties of a channel supported by the base station for MTC, and a transmitter module configured to transmit signals comprising the one or more bits through a broadcast channel. In some embodiments, the channel for MTC may have a corresponding set of resource blocks, and the one or more properties may identify a frequency offset of the set of resource blocks. In some embodiments, the channel for MTC may have a corresponding set of resource blocks, and the one or more properties may identify a position of the set of resource blocks in different sub-frames. In some embodiments, the channel for MTC may have a corresponding set of resource blocks, the base station may support one or more additional channels for MTC, where each of the one or more additional channels for MTC may have a corresponding set of resource blocks different from those of any other channel supported by the base station, and the one or more properties may identify a position of each set of resource blocks in a same sub-frame. In some embodiments, the one or more properties may identify one or more time periods during which the base station supports the channel for MTC.

An apparatus for wireless communications includes an MTC module configured to receive, at a first base station, coordinating information from an exchange between the first base station and a second base station such that the first base station communicates MTC information during one or more sub-frames in a frame while the second base station communicates MTC information during one or more different sub-frames in the same frame. The apparatus also includes a transceiver module configured to communicate the MTC information over a channel supported by the first base station for MTC during the one or more sub-frames. In some embodiments, the first base station may correspond to a small cell in a heterogeneous network and the second base station may correspond to a macro cell in the heterogeneous network.

In some embodiments, the MTC module may be further configured to assign a first set of resource blocks for communicating the MTC information during one of the one or more sub-frames, and to assign a second set of resource blocks, different from the first set of resource blocks, for communicating the MTC information during another of the one of more sub-frames. In some embodiments, the MTC module may be further configured to adjust a period for communicating the MTC information by the first base station based at least in part on a load of the first base station. In some embodiments, the second base station may be disabled such that no information is communicated during a set of resource blocks assigned for MTC during the one or more different sub-frames, and the MTC module may be further configured to enable the first base station to communicate MTC information during the set of resources blocks in the one or more different sub-frames. In some embodiments, based at least in part on the coordinating information, the first base station and the second base station may communicate MTC information at substantially the same power in corresponding sets of resource blocks assigned for MTC.

A computer program product includes a non-transitory computer-readable medium having code for causing at least one processor to assign, at a base station, one or more bits to indicate one or more properties of a channel supported by the base station for MTC, and code for causing the at least one processor to transmit signals comprising the one or more bits through a broadcast channel. In some embodiments, the channel for MTC may have a corresponding set of resource blocks, and the one or more properties may identify a frequency offset of the set of resource blocks. In some embodiments, the channel for MTC may have a corresponding set of resource blocks, and the one or more properties may identify a position of the set of resource blocks in different sub-frames. In some embodiments, the channel for MTC may have a corresponding set of resource blocks, the base station may support one or more additional channels for MTC, where each of the one or more additional channels for MTC may have a corresponding set of resource blocks different from those of any other channel supported by the base station, and the one or more properties may identify a position of each set of resource blocks in a same sub-frame. In some embodiments, the one or more properties may identify one or more time periods during which the base station supports the channel for MTC.

A computer program product includes a non-transitory computer-readable medium having code for causing at least one computer to receive, at a first base station, coordinating information from an exchange between the first base station and a second base station such that the first base station communicates MTC information during one or more sub-frames in a frame while the second base station communicates MTC information during one or more different sub-frames in the same frame. The non-transitory computer-readable medium has code for causing the at least one computer to communicate the MTC information over a channel supported by the first base station for MTC during the one or more sub-frames. In some embodiments, the first base station corresponds to a small cell in a heterogeneous network and the second base station corresponds to a macro cell in the heterogeneous network.

In some embodiments, the non-transitory computer-readable medium may have code for causing the at least one computer to assign a first set of resource blocks for communicating the MTC information during one of the one or more sub-frames, and code for causing the at least one computer to assign a second set of resource blocks, different from the first set of resource blocks, for communicating the MTC information during another of the one of more sub-frames. In some embodiments, the non-transitory computer-readable medium may have code for causing the at least one computer to adjust a period for communicating the MTC information by the first base station based at least in part on a load of the first base station. In some embodiments, the second base station may be disabled such that no information is communicated during a set of resource blocks assigned for MTC during the one or more different sub-frames, and the non-transitory computer-readable medium may have code for causing the at least one computer to enable the first base station to communicate MTC information during the set of resource blocks in the one or more different sub-frames. In some embodiments, based at least in part on the coordinating information, the first base station and the second base station may communicate MTC information at substantially the same power in corresponding sets of resource blocks assigned for MTC.

The invention claimed is:

1. A method for wireless communications, comprising:
   identifying, at a user equipment (UE), one or more properties of a channel supported by a first base station for machine type communication (MTC), the one or more properties being identified based at least in part on one or more bits in a signal received from the first base station through a broadcast channel;
   decoupling an uplink channel of the UE from a downlink channel of the UE such that the uplink channel is associated with the first base station and the downlink channel is associated with a second base station; and
   communicating downlink MTC information with the first base station and uplink MTC information with the second base station based on the one or more channel properties.

2. The method of claim 1, wherein:
   the channel for MTC has a corresponding set of resource blocks, and
   the one or more properties identify a frequency offset of the set of resource blocks.

3. The method of claim 1, wherein:
the channel for MTC has a corresponding set of resource blocks, and
the one or more properties identify a position of the set of resource blocks in different sub-frames.

4. The method of claim 1, wherein the one or more properties identify one or more time periods during which the first base station supports the channel for MTC, the method further comprising:
waking up the UE for communicating MTC information with the first base station in accordance with the one or more time periods.

5. The method of claim 1, further comprising:
receiving a synchronization signal; and
wherein the channel supported by the first base station for MTC has a corresponding set of resource blocks, and the one or more properties identify at least one narrowband channel for communicating MTC information.

6. The method of claim 5, wherein the one or more properties identify how many MTC occasions take place on the same sub-frame and on different narrowband channels.

7. The method of claim 1, wherein the first base station is a macrocell and the second base station is a small cell.

8. An apparatus for wireless communications, comprising:
means for identifying, at a user equipment (UE), one or more properties of a channel supported by a first base station for machine type communication (MTC), the one or more properties being identified based at least in part on one or more bits in a signal received from the first base station through a broadcast channel;
means for decoupling an uplink channel of the UE from a downlink channel of the UE such that the uplink channel is associated with the first base station and the downlink channel is associated with a second base station; and
means for communicating downlink MTC information with the first base station and uplink MTC information with the second base station based on the one or more channel properties.

9. The apparatus of claim 8, wherein:
the channel for MTC has a corresponding set of resource blocks, and
the one or more properties identify a frequency offset of the set of resource blocks.

10. The apparatus of claim 8, wherein:
the channel for MTC has a corresponding set of resource blocks, and
the one or more properties identify a position of the set of resource blocks in different sub-frames.

11. The apparatus of claim 8, wherein the one or more properties identify one or more time periods during which the first base station supports the channel for MTC, the apparatus further comprising:
means for waking up the UE for communicating MTC information with the first base station in accordance with the one or more time periods.

12. The apparatus of claim 8, further comprising:
means for receiving a synchronization signal; and
wherein the channel supported by the first base station for MTC has a corresponding set of resource blocks, and the one or more properties identify at least one narrowband channel for communicating MTC information.

13. The apparatus of claim 12, wherein the one or more properties identify how many MTC occasions take place on the same sub-frame and on different narrowband channels.

14. The apparatus of claim 8, wherein the first base station is a macrocell and the second base station is a small cell.

15. An apparatus for wireless communications, comprising:
a processor;
memory coupled to the processor, wherein the processor is configured to:
identify, at a user equipment (UE), one or more properties of a channel supported by a first base station for machine type communication (MTC), the one or more properties being identified based at least in part on one or more bits in a signal received from the first base station through a broadcast channel;
decouple an uplink channel of the UE from a downlink channel of the UE such that the uplink channel is associated with the first base station and the downlink channel is associated with a second base station; and
a transceiver module to communicate downlink MTC information with the first base station and uplink MTC information with the second base station based on the one or more channel properties.

16. The apparatus of claim 15, wherein:
the channel for MTC has a corresponding set of resource blocks, and
the one or more properties identify a frequency offset of the set of resource blocks.

17. The apparatus of claim 15, wherein:
the channel for MTC has a corresponding set of resource blocks, and
the one or more properties identify a position of the set of resource blocks in different sub-frames.

18. The apparatus of claim 15, wherein the one or more properties identify one or more time periods during which the first base station supports the channel for MTC, wherein the processor is further configured to:
wake up the UE for communicating MTC information with the first base station in accordance with the one or more time periods.

19. The apparatus of claim 15, wherein the processor is further configured to:
receive a synchronization signal; and
wherein the channel for MTC has a corresponding set of resource blocks, and the one or more properties identify at least one narrowband channel for communicating MTC information.

20. The apparatus of claim 19, wherein the one or more properties identify how many MTC occasions take place on the same sub-frame and on different narrowband channels.

21. The apparatus of claim 15, wherein the first base station is a macrocell and the second base station is a small cell.

22. A non-transitory computer-readable medium for storing instructions executable by a processor, comprising:
instructions to identify, at a user equipment (UE), one or more properties of a channel supported by a first base station for machine type communication (MTC), the one or more properties being identified based at least in part on one or more bits in a signal received from the first base station through a broadcast channel;
instructions to decouple an uplink channel of the UE from a downlink channel of the UE such that the uplink channel is associated with the first base station and the downlink channel is associated with a second base station; and instructions to communicate downlink MTC information with the first base station and uplink MTC information with the second base station based on the one or more channel properties.

23. The non-transitory computer-readable medium of claim 22, wherein:
the channel for MTC has a corresponding set of resource blocks, and
the one or more properties identify a frequency offset of the set of resource blocks.

24. The non-transitory computer-readable medium of claim 22, wherein:
the channel for MTC has a corresponding set of resource blocks, and
the one or more properties identify a position of the set of resource blocks in different sub-frames.

25. The non-transitory computer-readable medium of claim 22, wherein:
the one or more properties identify one or more time periods during which the first base station supports the channel for MTC, and
the computer-readable medium further comprises instructions to wake up the UE for communicating MTC information with the first base station in accordance with the one or more time periods.

26. The non-transitory computer-readable medium of claim 22, further comprising:
instructions to receive a synchronization signal; and
wherein the channel for MTC has a corresponding set of resource blocks, and
the one or more properties identify at least one narrowband channel for communicating MTC information.

27. The non-transitory computer-readable medium of claim 26, wherein the one or more properties identify how many MTC occasions take place on the same sub-frame and on different narrowband channels.

28. The non-transitory computer-readable medium of claim 22, wherein the first base station is a macrocell and the second base station is a small cell.

* * * * *